(12) United States Patent
Ichikawa et al.

(10) Patent No.: US 9,409,491 B2
(45) Date of Patent: Aug. 9, 2016

(54) PARKING ASSIST SYSTEM FOR VEHICLE, CONTACTLESS POWER TRANSMITTING DEVICE, AND CONTACTLESS POWER RECEIVING DEVICE

(71) Applicants: Shinji Ichikawa, Toyota (JP); Masayuki Komatsu, Toyota (JP); Hidetoshi Matsuki, Sendai (JP); Fumihiro Sato, Sendai (JP); Tetsuya Takura, Sendai (JP); Hiroto Yamaguchi, Sendai (JP)

(72) Inventors: Shinji Ichikawa, Toyota (JP); Masayuki Komatsu, Toyota (JP); Hidetoshi Matsuki, Sendai (JP); Fumihiro Sato, Sendai (JP); Tetsuya Takura, Sendai (JP); Hiroto Yamaguchi, Sendai (JP)

(73) Assignees: TOYOTA JIDOSHA KABUSHIKI KAISHA, Toyota (JP); TOHOKU UNIVERSITY, Sendai-shi (JP)

( * ) Notice: Subject to any disclaimer, the term of this patent is extended or adjusted under 35 U.S.C. 154(b) by 0 days.

(21) Appl. No.: 14/438,356

(22) PCT Filed: Oct. 29, 2013

(86) PCT No.: PCT/IB2013/002397
§ 371 (c)(1),
(2) Date: Apr. 24, 2015

(87) PCT Pub. No.: WO2014/068384
PCT Pub. Date: May 8, 2014

(65) Prior Publication Data
US 2015/0291048 A1 Oct. 15, 2015

(30) Foreign Application Priority Data
Oct. 31, 2012 (JP) .................................. 2012-240071

(51) Int. Cl.
*B60L 11/18* (2006.01)
*B60L 3/10* (2006.01)

(52) U.S. Cl.
CPC ............. *B60L 11/1833* (2013.01); *B60L 3/106* (2013.01); *B60L 11/182* (2013.01); *B60L 11/1829* (2013.01); *Y02T 10/7005* (2013.01); *Y02T 10/7072* (2013.01); *Y02T 90/12* (2013.01);
(Continued)

(58) Field of Classification Search
CPC combination set(s) only.
See application file for complete search history.

(56) References Cited

U.S. PATENT DOCUMENTS 4,651,066 A * 3/1987 Gritter ................ B60L 11/1807
180/65.51
2004/0212473 A1 * 10/2004 Iwazaki .................. F16D 27/14
336/90

(Continued)

FOREIGN PATENT DOCUMENTS

JP 2008-288889 A 11/2008
JP 2008-301645 A 12/2008

(Continued)

*Primary Examiner* — Thomas G Black
*Assistant Examiner* — Ana Thomas
(74) *Attorney, Agent, or Firm* — Oliff PLC

(57) ABSTRACT

A parking assist system for a vehicle includes a target position setting unit setting a vehicle target parking position on the basis of a coil type and position of a power transmitting unit. When the coil type is a composite coil having a configuration such that an annular coil wound to surround a first axis and a solenoid coil wound to surround a second axis intersecting with the first axis are serially connected, the target position setting unit sets the target parking position such that a center of a power receiving unit mounted on the vehicle is located at a predetermined distance from the first axis along the second axis. The solenoid coil is set at a position with respect to the annular coil such that the first axis extends through a side face center portion of the solenoid coil.

12 Claims, 15 Drawing Sheets

(52) U.S. Cl.
CPC .............. *Y02T90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2008/0298100 A1 | 12/2008 | Esaka et al. | |
| 2011/0086256 A1 | 4/2011 | Julstrom et al. | |
| 2011/0254503 A1* | 10/2011 | Widmer | B60L 11/182 320/108 |
| 2012/0323423 A1* | 12/2012 | Nakamura | B60L 11/123 701/22 |
| 2013/0229061 A1 | 9/2013 | Budhia et al. | |
| 2013/0335015 A1 | 12/2013 | Ichikawa et al. | |
| 2015/0357828 A1* | 12/2015 | Ichikawa | H01F 38/14 307/104 |

FOREIGN PATENT DOCUMENTS

| | | |
|---|---|---|
| JP | 2011-003947 A | 1/2011 |
| JP | 2011-257914 A | 12/2011 |
| JP | 2012-080671 A | 4/2012 |
| JP | 2012-080770 A | 4/2012 |
| JP | 2013534040 A | 8/2013 |
| JP | 2013-254852 A | 12/2013 |
| JP | 2013-258881 A | 12/2013 |
| WO | 2006/001557 A1 | 1/2006 |
| WO | 2011/127455 A2 | 10/2011 |
| WO | 2011/145953 A1 | 11/2011 |

* cited by examiner

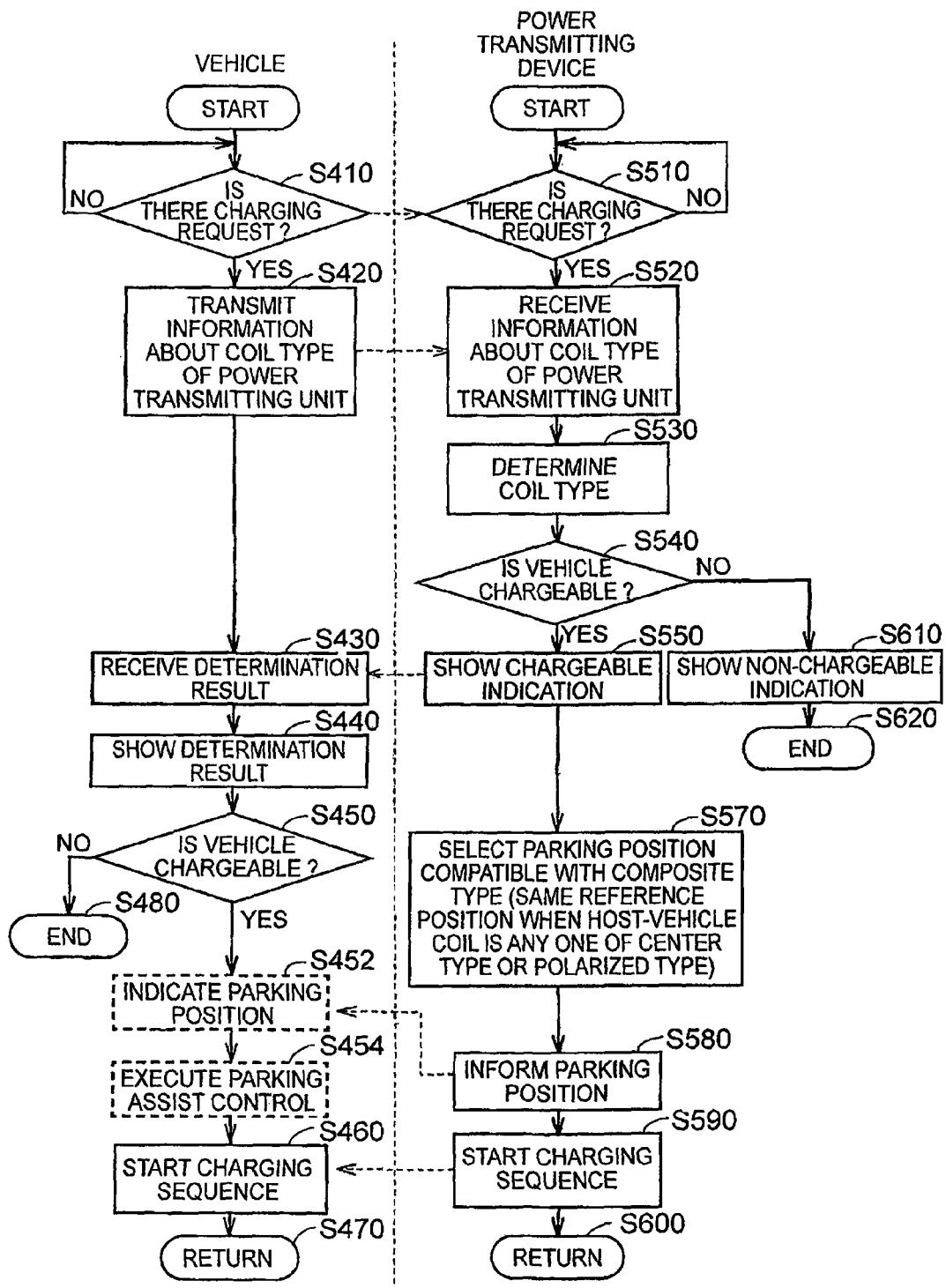

PARKING ASSIST SYSTEM FOR VEHICLE, CONTACTLESS POWER TRANSMITTING DEVICE, AND CONTACTLESS POWER RECEIVING DEVICE

BACKGROUND OF THE INVENTION

1. Field of the Invention

The invention relates to a parking assist system for a vehicle, a contactless power transmitting device and a contactless power receiving device and, more, particularly, to a parking assist system that assists a vehicle, which contactlessly receives electric power, in parking.

2. Description of Related Art

In recent years, a technique for contactlessly transmitting or receiving power to or from a device becomes a focus of attention because of less expense in time and effort for connection, or the like. Contactless charging is in practical use for charging a portable device, an electric vehicle, or the like.

Japanese Patent Application publication No. 2008-288889 (JP 2008-288889 A) describes that a coil formed of a combination of a plurality of coil-shaped members is arranged in a center space of a power supply coil or a power receiving coil that is used for charging an electric vehicle, or the like.

Coil units of a plurality of types have been studied for use in a power transmitting unit and a power receiving unit in contactless power supply.

In contactless power supply, a magnetic flux distribution that is generated in a coil unit or a magnetic flux distribution suitable for a coil unit to receive, electric power varies on the basis of a coil shape, a winding method, a magnetic core shape, and the like. When the magnetic flux distributions of a pair of power transmitting portion and power receiving portion are different from each other, it is not possible to efficiently transmit or receive electric power. It is inconvenient that electric power cannot be transmitted or received at all because of a mismatch between the magnetic flux distribution of the power transmitting portion and the magnetic flux distribution of the power receiving portion.

Depending on a combination of coil types of the power transmitting unit and power receiving unit, the transfer efficiency may be higher when there is a positional deviation than when there is no positional deviation. However, if a location to which a vehicle is guided is changed for each coil type, a driver should stop the vehicle at the center of a parking lot or stop the vehicle at a location that slightly deviates from the center of a parking lot, so a parking feeling deteriorates.

SUMMARY OF THE INVENTION

The invention provides a parking assist system for a vehicle, a contactless power transmitting device and a contactless power receiving device that allow a driver to adjust the position of a power transmitting unit to the position of a power receiving unit with uniform operation at the time of parking when a combination of a plurality of coil types is targeted.

An aspect of the invention provides a parking assist system for a vehicle configured to contactlessly receive electric power. The parking assist system includes a detecting unit and a target position setting unit. The detecting unit is configured to detect a coil type of a power transmitting portion of a power supply device installed at a parking lot. The target position setting unit is configured to set a target parking position of the vehicle on the basis of the coil type of the power transmitting portion and a position of the power transmitting portion, the target position setting unit being configured to set the target parking position such that a center of the power receiving portion mounted on the vehicle is located at a predetermined distance from a first axis along a second axis, when the coil type detected by the detecting unit is a composite coil having a configuration such that an annular coil and a solenoid coil are connected in series with each other, the annular coil being wound to surround the first axis, the solenoid coil being located with respect to the annular coil such that the first axis extends through a side face center portion, and the solenoid coil being wound to surround the second axis that intersects with the first axis.

In the above parking assist system, the coil type of the power receiving portion mounted on the vehicle may be one of the annular coil and the solenoid coil.

Another aspect of the invention provides a parking assist system that includes a power receiving portion, included in a vehicle, and a target position setting unit. The power receiving portion is configured to contactlessly receive electric power. The power receiving portion includes a composite coil having a configuration such that an annular coil and a solenoid coil are connected in series with each other. The annular coil is wound to surround a first axis, and the solenoid coil is located with respect to the annular coil such that the first axis extends through a side face center portion, the solenoid coil being wound to surround a second axis that intersects with the first axis. The target position setting unit is configured to set a target parking position of the vehicle on the basis of a position of a power transmitting portion of a power supply device installed at a parking lot, the target position setting unit being configured to set the target parking position such that a center of the power transmitting portion is located at a predetermined distance from the first axis along the second axis.

In the above parking assist system, the coil type of the power transmitting portion may be one of the annular coil and the solenoid coil.

In the above parking assist system, the predetermined distance may be shorter than or equal to a distance from the side face center portion of the solenoid coil to a side face end portion of the solenoid coil.

In the above parking assist system, the solenoid coil may have a configuration such that a conductive wire is wound around a flat sheet magnetic material. The solenoid coil may be configured to be located with respect to the annular coil such that the first axis extends through a center portion of the flat sheet in the composite coil.

In the above parking assist system, a difference between the natural frequency of the power transmitting portion and the natural frequency of the power receiving portion may fall within the range of ±10%. The power receiving portion may be configured to receive electric power from the power transmitting portion through at least one of a magnetic field and an electric field. The magnetic field is between the power receiving portion and the power transmitting portion, and the magnetic field oscillates at a predetermined frequency. The electric field is between the power receiving portion and the power transmitting portion, and the electric field oscillates at a predetermined frequency.

Further another aspect of the invention provides a contactless power transmitting device. The contactless power transmitting device includes a first coil and a second coil. The first coil is a coil wound to surround a first axis. The second coil is a coil connected in series with the first coil and wound to surround a second axis that intersects with the first axis. The second coil has a configuration such that a conductive wire is wound around a flat sheet magnetic material. The second coil is configured to be located with respect to the first coil such that the first axis extends through a center portion of the flat sheet.

Yet another aspect of the invention provides a contactless power receiving device. The contactless power receiving device includes a first coil and a second coil. The first coil is a coil wound to surround a first axis. The second coil is a coil connected in series with the first coil and wound to surround a second axis that intersects with the first axis. The second coil has a configuration such that a conductive wire is wound around a flat sheet magnetic material. The second coil is configured to be located with respect to the first coil such that the first axis extends through a center portion of the flat sheet.

Through researches of the inventors of the present application, it is found that, in a composite coil that is a combination of a solenoid coil and an annular coil, irrespective of whether the counterpart coil is a solenoid coil or an annular coil, it is more efficient when center positions are slightly deviated from each other than when the center positions coincide with each other (shown in FIG. 18 later). The invention was created, and is characterized to constantly guide a center of a solenoid coil and a center of an annular coil to be located at deviated positions when a composite coil is used.

According to the invention, the vehicle just needs to be parked at substantially the same position even when the counterpart coil type is different, so a driver does not experience a complicated feeling at the time of parking.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 24 is a flowchart for illustrating control that is executed in the vehicle and the power transmitting device according to the second embodiment of the invention.

DETAILED DESCRIPTION OF EMBODIMENTS

Figure 1:
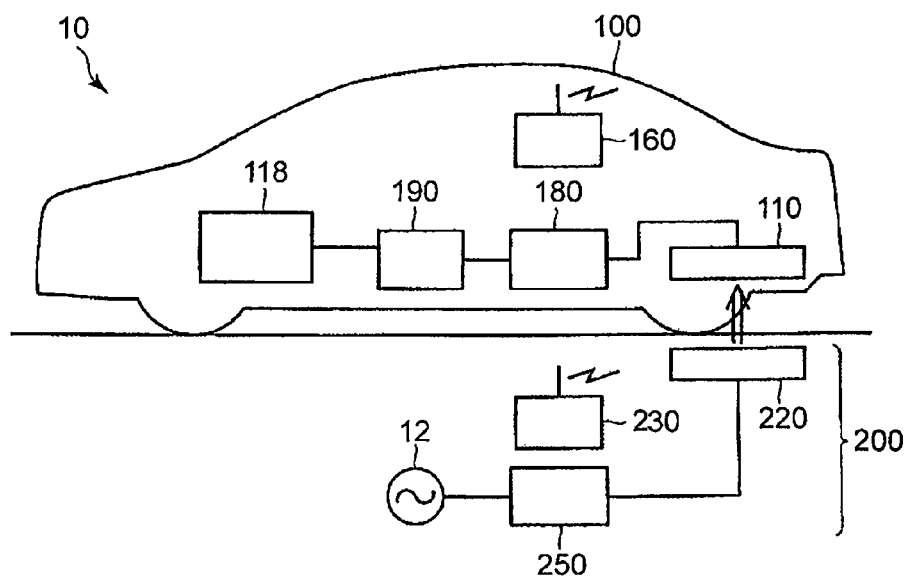
FIG. 1 is an overall block diagram that shows an example of a contactless power transfer system according to an embodiment of the invention.

Hereinafter, embodiments of the invention will be described in detail with reference to the accompanying drawings. Like reference numerals denote the same or corresponding components, and the description thereof is not repeated.

The overall configuration of a contactless power transfer system will be described. FIG. 1 is an overall block diagram that shows an example of the contactless power transfer system. An electric vehicle that uses a rotary electric machine as a driving source is illustrated as a vehicle 100; however, the vehicle 100 may be another automobile as long as it contactlessly receives electric power, and, furthermore, a power receiving object may not be a vehicle.

As shown in FIG. 1, the contactless power transfer system includes a power transmitting device 200 and the vehicle 100. The power transmitting device 200 includes a power supply unit 250, a power transmitting unit 220 and a communication unit 230. The vehicle 100 includes a power receiving unit 110, a rectifier 180, an electrical storage device 190 and a power generating device 118.

The power supply unit 250 generates high-frequency alternating-current power upon reception of electric power from a power supply 12. The power supply 12 may be a commercial power supply or may be an independent power supply device. The power transmitting unit 220 receives high-frequency alternating-current power supplied from the power supply unit 250, and contactlessly transfers electric power to the power receiving unit 110. As an example, the power transmitting unit 220 is formed of a resonance circuit that includes a coil and a capacitor.

On the other hand, in the vehicle 100, the power receiving unit 110 contactlessly receives electric power that is transmitted from the power transmitting unit 220 of the power transmitting device 200, and outputs the received electric power to the rectifier 180. As an example, the power receiving unit 110 is also formed of a resonance circuit that includes a coil and a capacitor.

The rectifier 180 converts alternating-current power, which is received from the power receiving unit 110, to direct-current power, and outputs the converted direct-current power to the electrical storage device 190. Thus, the rectifier 180 charges the electrical storage device 190. The electrical storage device 190 stores electric power that is output from the rectifier 180, and also stores electric power that is generated by the power generating device 118. The electrical storage device 190 supplies the stored electric power to the power generating device 118. Other than the secondary battery, a large-capacitance capacitor may be employed as the electrical storage device 190.

The power generating device 118 generates driving force for propelling the vehicle 100 by using electric power stored in the electrical storage device 190. Although not specifically shown in FIG. 1, the power generating device 118, for example, includes an inverter that receives electric power from the electrical storage device 190, a motor that is driven by the inverter, drive wheels that are driven by the motor, and the like. The power generating device 118 may include a generator for charging the electrical storage device 190 and an engine that is able to drive the generator.

In the contactless power transfer system, the natural frequency of the power transmitting unit 220 of the power transmitting device 200 is the same as the natural frequency of the power receiving unit 110 of the vehicle 100. Here, the natural frequency of the power transmitting unit 220 (power receiving unit 110) means an oscillation frequency in the case where the electric circuit (resonance circuit) that constitutes the power transmitting unit 220 (power receiving unit 110) freely oscillates. In the electric circuit (resonance circuit) that constitutes the power transmitting unit 220 (power receiving unit 110), the natural frequency at the time when braking force or electrical resistance is zero or substantially zero is also called the resonance frequency of the power transmitting unit 220 (power receiving unit 110).

The meaning of the phrase that the natural frequency is the same not only includes the case where the natural frequency is completely the same but also the case where the natural frequency is substantially the same. The phrase that the natural frequency is substantially the same, for example, means the case where the difference between the natural frequency of the power transmitting unit 220 and the natural frequency of the power receiving unit 110 falls within 10% of the natural frequency of one of the power transmitting unit 220 and the power receiving unit 110.

In the power transfer system according to the present embodiment, the difference between the natural frequency of the power transmitting unit 220 and the natural frequency of the power receiving unit 110 is smaller than or equal to 10% of the natural frequency of one of the power receiving unit 110 and the power transmitting unit 220. By setting the natural frequency of each of the power transmitting unit 220 and the power receiving unit 110 within the above range, it is possible to increase the power transfer efficiency. On the other hand, when the difference in natural frequency is larger than 10% of the natural frequency of one of the power receiving unit 110 and the power transmitting unit 220, the power transfer efficiency becomes lower than 10%, so there may occur an inconvenience, such as an increase in the charging time of the electrical storage device 190.

The power transmitting unit 220 contactlessly transmits electric power to the power receiving unit 110 of the vehicle 100 via at least one of a magnetic field that is formed between the power transmitting unit 220 and the power receiving unit 110 and that oscillates at a predetermined frequency and an electric field that is formed between the power transmitting unit 220 and the power receiving unit 110 and that oscillates at a predetermined frequency.

In this way, by resonating the power transmitting unit 220 and the power receiving unit 110 through the electromagnetic field, electric power is contactlessly transferred from the power transmitting unit 220 of the power transmitting device 200 to the power receiving unit 110 of the vehicle 100.

As described above, in the contactless power transfer system, by resonating the power transmitting unit 220 and the power receiving unit 110 through the electromagnetic field, electric power is contactlessly transferred from the power transmitting unit 220 to the power receiving unit 110. Coupling between the power transmitting unit 220 and the power receiving unit 110 in power transfer is, for example, called magnetic resonance coupling, magnetic field resonance coupling, near field resonance coupling, electromagnetic field resonance coupling, electric field resonance coupling, or the like. The electromagnetic field resonance coupling means coupling that includes the magnetic resonance coupling, the magnetic field resonance coupling and the electric field resonance coupling.

When the power transmitting unit 220 and the power receiving unit 110 are formed of coils as described above, the power transmitting unit 220 and the power receiving unit 110 are mainly coupled through a magnetic field, and magnetic resonance coupling or magnetic field resonance coupling is formed. For example, an antenna, such as a meander line antenna, may be employed as each of the power transmitting unit 220 and the power receiving unit 110. In this case, the power transmitting unit 220 and the power receiving unit 110 are mainly coupled through an electric field, and electric field resonance coupling is formed.

Figure 2:
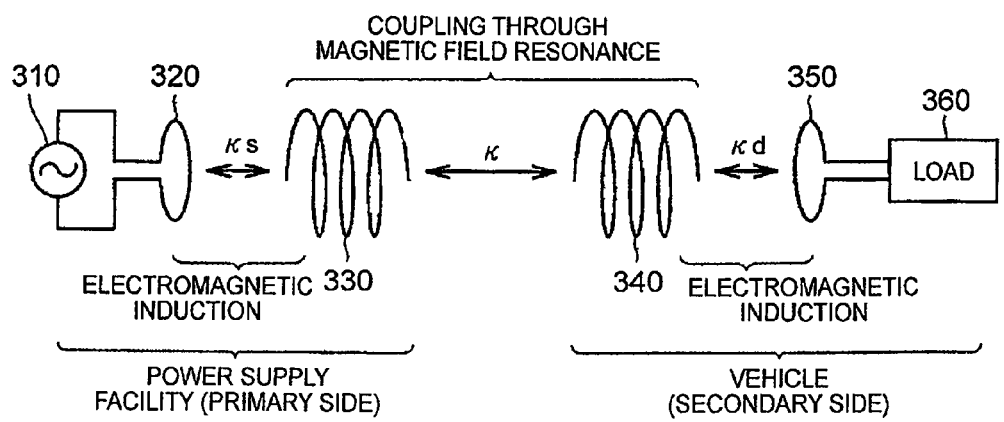
FIG. 2 is a schematic view for illustrating the principle of transmission of electric power through a resonance method.

FIG. 2 is a schematic view for illustrating the principle of transmission of electric power through a resonance method. Referring to FIG. 2, in the resonance method, as in the case where two tuning forks resonate with each other, two LC resonance coils having the same natural frequency resonate with each other in an electromagnetic field (near field) to thereby transfer electric power from one of the coils to the other one of the coils.

Specifically, a primary coil 320 is connected to a high-frequency power supply 310, and high-frequency electric power is supplied through electromagnetic induction to a primary self-resonance coil 330 that is magnetically coupled to the primary coil 320. The primary self-resonance coil 330 is an LC resonator formed of the inductance and stray capacitance of the coil itself, and resonates via an electromagnetic field (near field) with a secondary self-resonance coil 340 having the same resonance frequency as the primary self-resonance coil 330. Then, energy (electric power) is transferred from the primary self-resonance coil 330 to the secondary self-resonance coil 340 via the electromagnetic field. Energy (electric power) transferred to the secondary self-resonance coil 340 is extracted by a secondary coil 350 that is magnetically coupled to the secondary self-resonance coil 340 through electromagnetic induction, and is supplied to a load 360. Transmission of electric power through the resonance method is implemented when the Q value that indicates the resonance strength between the primary self-resonance coil 330 and the secondary self-resonance coil 340 is larger than, for example, 100.

In the power transfer system according to the present embodiment, electric power is transmitted from the power transmitting unit to the power receiving unit by resonating the power transmitting unit and the power receiving unit through the electromagnetic field, and the coupling coefficient κ between the power transmitting unit and the power receiving unit may be various values at which power transfer becomes good.

Figure 6:
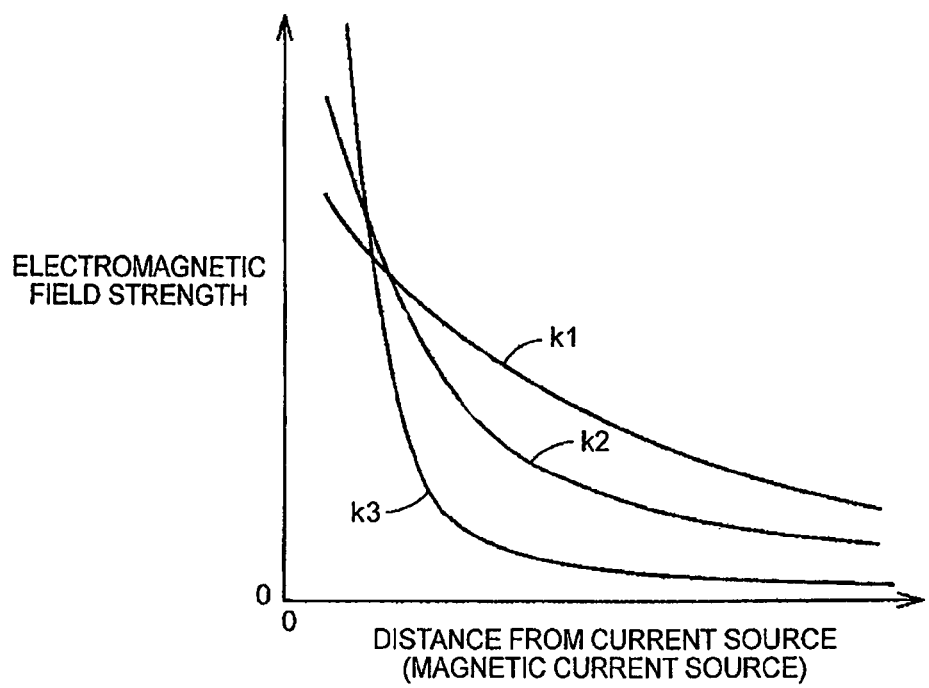
FIG. 6 is a graph that shows the correlation between a distance from a current source (magnetic current source) and the strength of an electromagnetic field.

The correspondence relationship between FIG. 6 and FIG. 1 is that the secondary self-resonance coil 340 and the secondary coil 350 correspond to the power receiving unit 110 shown in FIG. 1 and the primary coil 320 and the primary self-resonance coil 330 correspond to the power transmitting unit 220 shown in FIG. 1.

Figure 3:
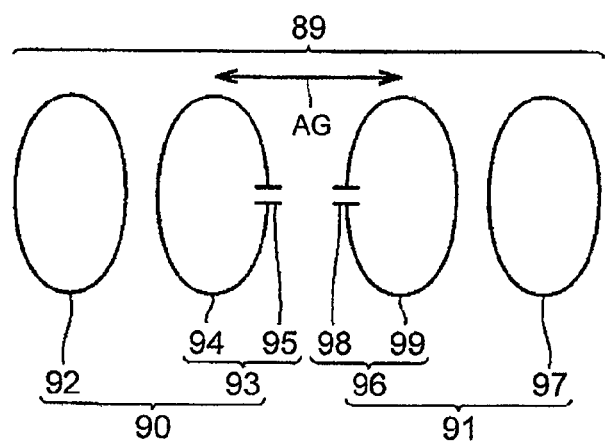
FIG. 3 is a view that shows a simulation model of a power transfer system.

Next, the simulation result obtained by analyzing the correlation between a difference in natural frequency and a power transfer efficiency will be described with reference to FIG. 3 and FIG. 4. FIG. 3 is a view that shows a simulation model of a power transfer system. The power transfer system 89 includes a power transmitting unit 90 and a power receiving unit 91. The power transmitting unit 90 includes an electromagnetic induction coil 92 and a power transmitting portion 93. The power transmitting portion 93 includes a resonance coil 94 and a capacitor 95 provided in the resonance coil 94.

The power receiving unit 91 includes a power receiving portion 96 and an electromagnetic induction coil 97. The power receiving portion 96 includes a resonance coil 99 and a capacitor 98 that is connected to the resonance coil 99.

The inductance of the resonance coil 94 is set to Lt, and the capacitance of the capacitor 95 is set to C1. The inductance of the resonance coil 99 is set to Lr, and the capacitance of the capacitor 98 is set to C2. When the parameters are set in this way, the natural frequency f1 of the power transmitting portion 93 is expressed by the following mathematical expression (1), and the natural frequency f2 of the power receiving portion 96 is expressed by the following mathematical expression (2):

$$f1=1/\{2\pi(Lt \times C1)^{1/2}\} \quad (1)$$

$$f2=1/\{2\pi(Lr \times C2)^{1/2}\} \quad (2)$$

Figure 4:
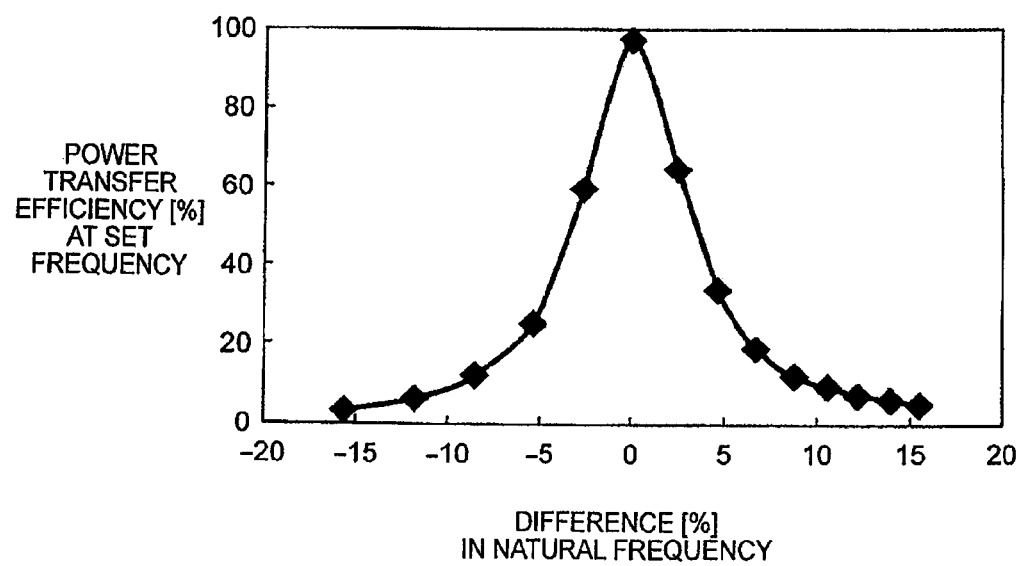
FIG. 4 is a graph that shows the correlation between a difference in natural frequency of each of a power transmitting portion and a power receiving portion that are shown in FIG. 3 and a power transfer efficiency.

FIG. 4 is a graph that shows the correlation between a difference in the natural frequency of each of the power transmitting portion 93 and the power receiving portion 96 and a power transfer efficiency. FIG. 4 shows the case where the inductance Lr and the capacitances C1 and C2 are fixed and only the inductance Lt is varied.

In this simulation, a relative positional relationship between the resonance coil 94 and the resonance coil 99 is fixed, and, furthermore, the frequency of current that is supplied to the power transmitting portion 93 is constant.

As shown in FIG. 4, the abscissa axis represents a difference Df (%) in natural frequency, and the ordinate axis represents a power transfer efficiency (%) at a set frequency. The difference Df (%) in natural frequency is expressed by the following mathematical expression (3).

(Difference in Natural Frequency)=
$\{(f1-f2)/f2\} \times 100(\%)$ (3)

As is apparent from FIG. 4, when the difference (%) in natural frequency is ±0%, the power transfer efficiency is close to 100%. When the difference (%) in natural frequency is ±5%, the power transfer efficiency is 40%. When the difference (%) in natural frequency is ±10%, the power transfer efficiency is 10%. When the difference (%) in natural frequency is ±15%, the power transfer efficiency is 5%. That is, it is found that, by setting the natural frequency of each of the power transmitting portion and the power receiving portion such that the absolute value of the difference (%) in natural frequency (difference in natural frequency) is smaller than or equal to 10% of the natural frequency of the power receiving portion 96, it is possible to increase the power transfer efficiency. Furthermore, by setting the natural frequency of each of the power transmitting portion and the power receiving portion such that the absolute value of the difference (%) in natural frequency is smaller than or equal to 5% of the natural frequency of the power receiving portion 96, it is possible to further increase the power transfer efficiency, so it is more desirable. The electromagnetic field analyzation software application (JMAG (trademark): produced by JSOL Corporation) is employed as a simulation software application.

Here, the magnetic field having the predetermined frequency, which is formed around the resonance coil in the power transmitting unit 220 shown in FIG. 1, will be described. The "magnetic field having the predetermined frequency" typically correlates with the power transfer efficiency and the frequency of current that is supplied to the resonance coil of the power transmitting unit 220. Then, first, the correlation between the power transfer efficiency and the frequency of current that is supplied to the resonance coil of the power transmitting unit 220 will be described. The power transfer efficiency at the time when electric power is transferred from the resonance coil of the power transmitting unit 220 to the resonances coil of the power receiving unit 110 varies depending on various factors, such as a distance between the resonance coil of the power transmitting unit 220 and the resonance coil of the power receiving unit 110. For example, the natural frequency (resonance frequency) of each of the power transmitting unit 220 and the power receiving unit 110 is set to f0, the frequency of current that is supplied to the resonance coil of the power transmitting unit 220 is set to f3, and the air gap between the resonance coil of the power receiving unit 110 and the resonance coil of the power transmitting unit 220 is set to AG.

Figure 5:
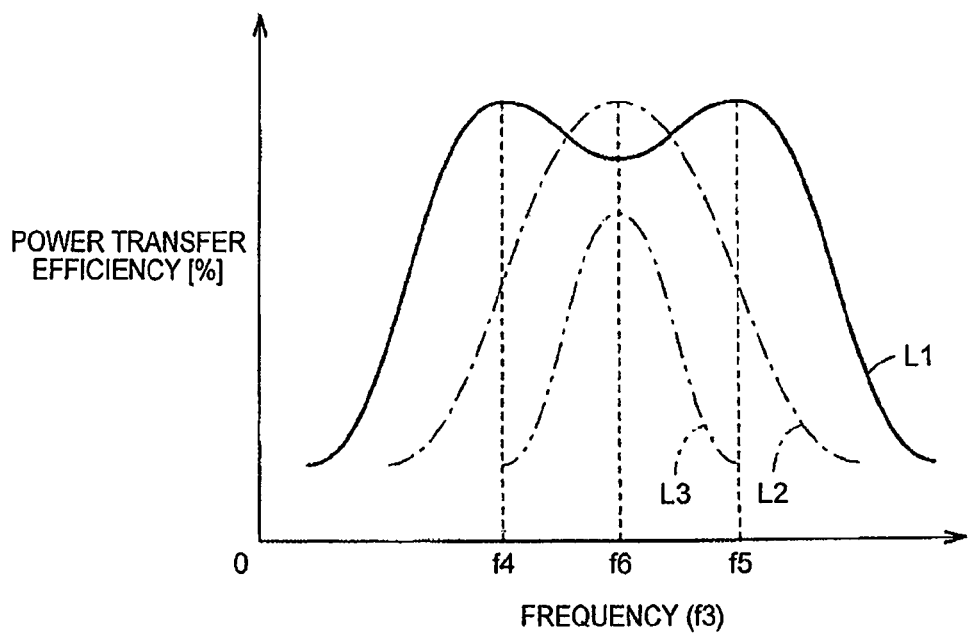
FIG. 5 is a graph that shows the correlation between a power transfer efficiency at the time when an air gap is varied and the frequency of a current that is supplied to a resonance coil in a power transmitting unit shown in FIG. 1 in a state where the natural frequency is fixed.

FIG. 5 is a graph that shows the correlation between a power transfer efficiency and the frequency f3 of current that is supplied to the resonance coil of the power transmitting unit 220 shown in FIG. 1 at the time when the air gap AG is varied in a state where the natural frequency f0 is fixed.

In the graph of FIG. 5, the abscissa axis represents the frequency f3 of current that is supplied to the resonance coil of the power transmitting unit 220, and the ordinate axis represents a power transfer efficiency (%). An efficiency curve L1 schematically shows the correlation between a power transfer efficiency and the frequency f3 of current that is supplied to the resonance coil of the power transmitting unit 220 when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, the power transfer efficiency becomes a peak when the frequency of current that is supplied to the resonance coil of the power transmitting unit 220 is f6. When the air gap AG is further increased from the state of the efficiency curve L2, the peak of the power transfer efficiency reduces as indicated by an efficiency curve L3.

For example, the following first method is conceivable as a method of improving the power transfer efficiency. In the first method, by varying the capacitances of the capacitors in accordance with the air gap AG while the frequency of current that is supplied to the resonance coil of the power transmitting unit 220 shown in FIG. 1 is constant, the characteristic of power transfer efficiency between the power transmitting unit 220 and the power receiving unit 110 is varied. Specifically, the capacitances of the capacitors are adjusted such that the power transfer efficiency becomes a peak in a state where the frequency of current that is supplied to the resonance coil of the power transmitting unit 220 is constant. In this method, irrespective of the size of the air gap AG, the frequency of current flowing through the resonance coil of the power transmitting unit 220 and the resonance coil of the power receiving unit 110 is constant. As a method of varying the characteristic of power transfer efficiency, a method of utilizing a matching transformer provided between the power transmitting unit 220 and the power supply unit 250, a method of utilizing a power receiving-side converter, or the like, may be employed.

In addition, in the second method, the frequency of current that is supplied to the resonance coil of the power transmitting unit 220 is adjusted on the basis of the size of the air gap AG. For example, as shown in FIG. 5, when the power transfer characteristic becomes the efficiency curve L1, current having the frequency f4 or the frequency f5 is supplied to the resonance coil of the power transmitting unit 220. When the frequency characteristic becomes the efficiency curve L2 or the efficiency curve L3, current having the frequency f6 is supplied to the resonance coil of the power transmitting unit 220. In this case, the frequency of current flowing through the resonance coil of the power transmitting unit 220 and the resonance coil of the power receiving unit 110 is varied in accordance with the size of the air gap AG.

In the first method, the frequency of current flowing through the resonance coil of the power transmitting unit 220 is a fixed constant frequency, and, in the second method, the frequency of current flowing through the resonance coil of the power transmitting unit 220 is a frequency that appropriately varies with the air gap AG. Through the first method, the second method, or the like, current having the predetermined frequency set such that the power transfer efficiency is high is supplied to the resonance coil of the power transmitting unit 220. When current having the predetermined frequency flows through the resonance coil of the power transmitting unit 220, a magnetic field (electromagnetic field) that oscillates at the predetermined frequency is formed around the resonance coil of the power transmitting unit 220. The power receiving unit 110 receives electric power from the power transmitting unit 220 through the magnetic field that is formed between the power receiving unit 110 and the power transmitting unit 220 and that oscillates at the predetermined frequency. Thus, the "magnetic field that oscillates at the predetermined frequency" is not necessarily a magnetic field having a fixed frequency. In the above-described embodiment, the frequency of current that is supplied to the resonance coil of the power transmitting unit 220 is set by focusing on the air gap AG; however, the power transfer efficiency also varies on the basis of other factors, such as a deviation in horizontal position between the resonance coil of the power transmitting unit 220 and the resonance coil of the power receiving unit 110, so the frequency of current that is supplied to the resonance coil of the power transmitting unit 220 may possibly be adjusted on the basis of those other factors.

In the power transfer system according to the present embodiment, a near field (evanescent field) in which the static electromagnetic field of an electromagnetic field is dominant is utilized. Thus, power transmitting and power receiving efficiencies are improved. FIG. 6 is a graph that shows the correlation between a distance from a current source (magnetic current source) and the strength of an electromagnetic field. As shown in FIG. 6, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component that is inversely proportional to the cube of the distance from the wave source, and is called static electromagnetic field. Where the wavelength of the electromagnetic field is $\lambda$, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in the power transfer system according to the present embodiment, a near field (evanescent field) in which the static electromagnetic field is dominant is utilized to transfer energy (electric power). That is, by resonating the power transmitting unit 220 and the power receiving unit 110 (for example, a pair of LC resonance coils) having the close natural frequencies in the near field in which the static electromagnetic field is dominant, energy (electric power) is transferred from the power transmitting unit 220 to the other power receiving unit 110. The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

Figure 7:
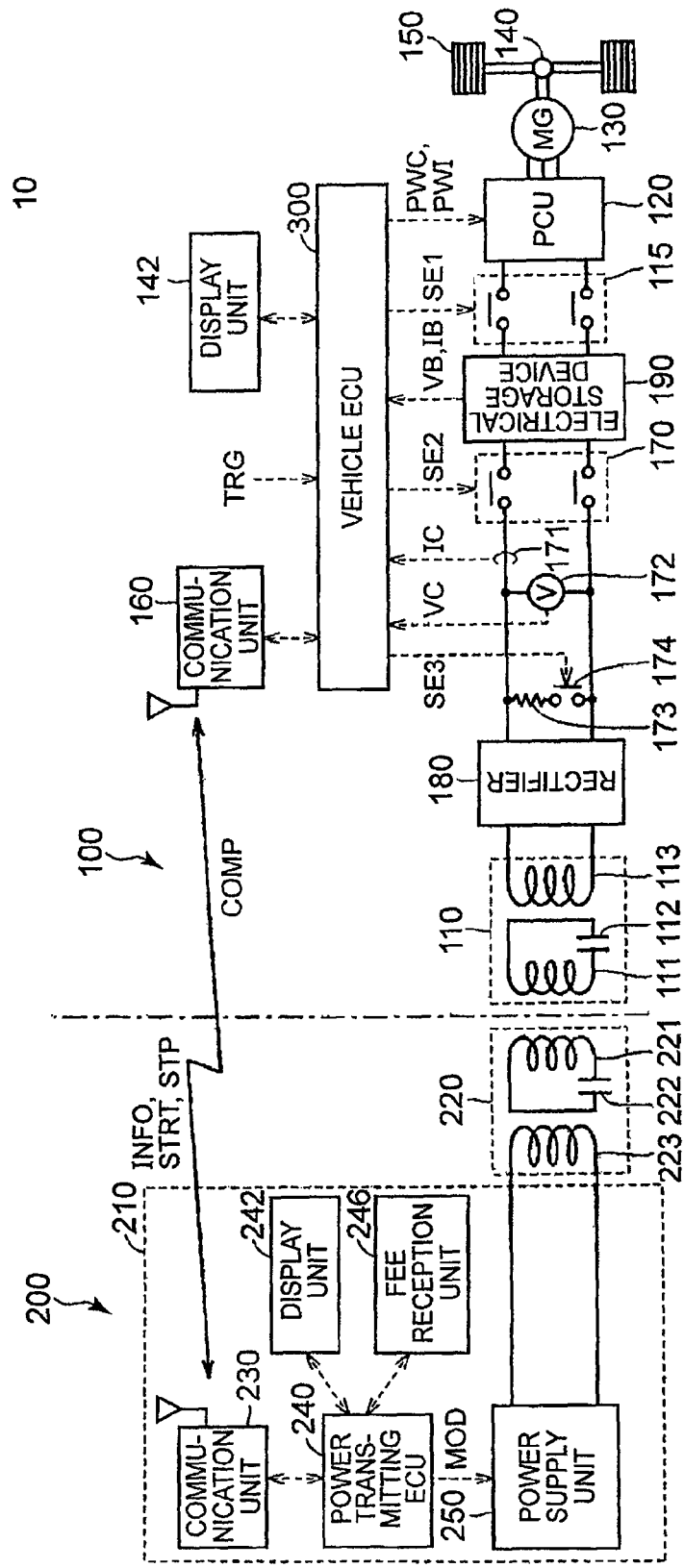
FIG. 7 is a circuit diagram that shows the detailed configuration of the power transfer system shown in FIG. 1.

Next, the configuration of contactless power transfer will be described in detail. FIG. 7 is a circuit diagram that shows the detailed configuration of a power transfer system 10 shown in FIG. 1. As shown in FIG. 7, the vehicle 100 includes the rectifier 180, a charging relay (CHR) 170, the electrical storage device 190, a system main relay (SMR) 115, a power control unit (PCU) 120, a motor generator 130, a power transmission gear 140, drive wheels 150, a vehicle electronic control unit (ECU) 300 that serves as a control unit, a current sensor 171 and a voltage sensor 172 in addition to the power receiving unit 110 and the communication unit 160. The power receiving unit 110 includes a coil 111 (hereinafter, referred to as secondary self-resonance coil 111, and may be referred to as "resonance coil", or the like, where appropriate), a capacitor 112 and a secondary coil 113.

In the present embodiment, an electric vehicle is, for example, described as the vehicle 100; however, the configuration of the vehicle 100 is not limited to the electric vehicle as long as the vehicle is able to travel by using electric power stored in the electrical storage device. Another example of the vehicle 100 includes a hybrid vehicle equipped with an engine, a fuel cell vehicle equipped with a fuel cell, and the like.

The secondary self-resonance coil 111 receives electric power through electromagnetic resonance by using an electromagnetic field from a primary self-resonance coil 221 included in the power transmitting device 200.

The number of turns of the secondary self-resonance coil 111 and a distance from the secondary self-resonance coil 111 to the primary self-resonance coil 221 of the power transmitting device 200 are appropriately set on the basis of the distance to the primary self-resonance coil 221, the resonance frequency of the primary self-resonance coil 221 and secondary self-resonance coil 111, and the like, such that a Q value that indicates the resonance strength between the primary self-resonance coil 221 and the secondary self-resonance coil 111 increases (for example, Q>100) and the coupling coefficient κ that indicates the degree of coupling between the primary self-resonance coil 221 and the secondary self-resonance coil 111 reduces.

The capacitor 112 is connected to both ends of the secondary self-resonance coil 111, and forms an LC resonance circuit together with the secondary self-resonance coil 111. The capacitance of the capacitor 112 is appropriately set on the basis of the inductance of the secondary self-resonance coil 111 such that a predetermined resonance frequency is obtained. The capacitance of the capacitor 112 is appropriately set on the basis of the inductance of the secondary self-resonance coil 111 such that a predetermined resonance frequency is obtained.

The secondary coil 113 is provided coaxially with the secondary self-resonance coil 111, and is able to be magnetically coupled to the secondary self-resonance coil 111 through electromagnetic induction. The secondary coil 113 extracts electric power, received by the secondary self-resonance coil 111, through electromagnetic induction and outputs the electric power to the rectifier 180.

The rectifier 180 rectifies alternating-current power received from the secondary coil 113, and outputs the rectified direct-current power to the electrical storage device 190 via the CHR 170. The rectifier 180 may be, for example, formed to include a diode bridge and a smoothing capacitor (both are not shown). The rectifier 180 may be a so-called switching regulator that rectifies alternating current using switching control; however, the rectifier 180 may be included in the power receiving unit 110, and, in order to prevent erroneous operation, or the like, of switching elements due to a generated electromagnetic field, the rectifier 180 is desirably a static rectifier, such as a diode bridge.

In the present embodiment, direct-current power rectified by the rectifier 180 is directly output to the electrical storage device 190; however, when a rectified direct-current voltage differs from a charging voltage that is allowed by the electrical storage device 190, a DC/DC converter (not shown) for voltage conversion may be provided between the rectifier 180 and the electrical storage device 190.

A load resistor 173 and a relay 174 that are serially connected for position detection are connected to an output portion of the rectifier 180. Before full-scale charging is started, a small electric power is transmitted from the power transmitting device 200 to the vehicle as a test signal. At this time, the relay 174 is controlled by a control signal SE3 from the vehicle ECU 300, and is set to a conductive state.

The voltage sensor 172 is provided between a pair of power lines that connect the rectifier 180 to the electrical storage device 190. The voltage sensor 172 detects a secondary-side direct-current voltage of the rectifier 180, that is, a received voltage received from the power transmitting device 200, and then outputs the detected value VC to the vehicle ECU 300. The vehicle ECU 300 determines a power receiving efficiency on the basis of the voltage VC, and transmits information about the power receiving efficiency to the power transmitting device 200 via the communication unit 160.

The current sensor 171 is provided in one of the power lines that connect the rectifier 180 to the electrical storage device 190. The current sensor 171 detects a charging current for charging the electrical storage device 190, and outputs the detected value IC to the vehicle ECU 300.

The CHR 170 is electrically connected to the rectifier 180 and the electrical storage device 190. The CHR 170 is controlled by a control signal SE2 from the vehicle ECU 300, and switches between supply and interruption of electric power from the rectifier 180 to the electrical storage device 190.

The electrical storage device 190 is an electric power storage element that is configured to be chargeable and dischargeable. The electrical storage device 190 is, for example, formed of a secondary battery, such as a lithium ion battery, a nickel-metal hydride battery and a lead-acid battery, or an electrical storage element, such as an electric double layer capacitor.

The electrical storage device 190 is connected to the rectifier 180 via the CHR 170. The electrical storage device 190 stores electric power that is received by the power receiving unit 110 and rectified by the rectifier 180. In addition, the electrical storage device 190 is also connected to the PCU 120 via the SMR 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

A voltage sensor and a current sensor (both are not shown) are provided for the electrical storage device 190. The voltage sensor is used to detect the voltage VB of the electrical storage device 190. The current sensor is used to detect a current IB input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The SMR 115 is inserted in power lines that connect the electrical storage device 190 to the PCU 120. Then, the SMR 115 is controlled by a control signal SE1 from the vehicle ECU 300, and switches between supply and interruption of electric power between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 by using electric power converted by the converter.

The motor generator 130 is an alternating-current rotary electric machine, and is, for example, a permanent-magnet synchronous motor that includes a rotor in which a permanent magnet is embedded.

The output torque of the motor generator 130 is transmitted to the drive wheels 150 via the power transmission gear 140 to drive the vehicle 100. The motor generator 130 is able to generate electric power by using the rotational force of the drive wheels 150 during regenerative braking operation of the vehicle 100. Then, the generated electric power is converted by the PCU 120 to charging electric power to charge the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated through the rotation of the engine.

As described above, the communication unit 160 is a communication interface for carrying out wireless communication between the vehicle 100 and the power transmitting device 200. The communication unit 160 outputs battery information INFO about the electrical storage device 190, including the SOC, from the vehicle ECU 300 to the power transmitting device 200. In addition, the communication unit 160 outputs a signal STRT or a signal STP, which instructs the power transmitting device 200 to start or stop transmission of electric power, to the power transmitting device 200.

The vehicle ECU 300 includes a central processing unit (CPU), a storage unit and an input/output buffer, which are not shown in FIG. 7. The vehicle ECU 300 inputs signals from the sensors, and the like, outputs control signals to the devices, and controls the vehicle 100 and the devices. These controls are not only limited to processing by software but may also be processed by exclusive hardware (electronic circuit).

When the vehicle ECU 300 receives a charging start signal TRG through user's operation, or the like, the vehicle ECU 300 outputs the signal STRT for instructions to start transmission of electric power to the power transmitting device 200 via the communication unit 160 on the basis of the fact that a predetermined condition is satisfied. In addition, the vehicle ECU 300 outputs the signal STP for instructions to stop transmission of electric power to the power transmitting device 200 via the communication unit 160 on the basis of the fact that the electrical storage device 190 is fully charged, user's operation, or the like.

The power transmitting device 200 includes a charging station 210 and the power transmitting unit 220. The charging station 210 further includes a power transmitting ECU 240 that serves as a control unit, a power supply unit 250, a display unit 242 and a fee reception unit 246 in addition to the communication unit 230. In addition, the power transmitting unit 220 includes the coil 221 (hereinafter, referred to as primary self-resonance coil 221, and may be referred to as "resonance coil", or the like, where appropriate), a capacitor 222 and a primary coil 223.

The power supply unit 250 is controlled by a control signal MOD from the power transmitting ECU 240, and converts electric power, received from the alternating-current power supply, such as a commercial power supply, to high-frequency electric power. Then, the power supply unit 250 supplies the converted high-frequency electric power to the primary coil 223.

Although a matching transformer for impedance conversion is not shown in FIG. 7; however, the matching transformer 260 may be provided between the power supply unit 250 and the power transmitting unit 220 or between the power receiving unit 110 and the rectifier 180.

The primary self-resonance coil 221 transfers electric power to the secondary self-resonance coil 111, included in the power receiving unit 110 of the vehicle 100, through electromagnetic resonance.

The number of turns of the primary self-resonance coil 221 and a distance from the primary self-resonance coil 221 to the secondary self-resonance coil 111 of the vehicle 100 may be appropriately set on the basis of the distance to the secondary self-resonance coil 111, the resonance frequency between the primary self-resonance coil 221 and the secondary self-resonance coil 111, and the like, such that the Q value that indicates the resonance strength between the primary self-resonance coil 221 and the secondary self-resonance coil 111 increases (for example, Q>100) and the coupling coefficient κ that indicates the degree of coupling between the primary self-resonance coil 221 and the secondary self-resonance coil 111 reduces. The coupling coefficient κ is not limited to such values; it may be various values at which power transfer is good.

The capacitor 222 is connected to both ends of the primary self-resonance coil 221, and forms an LC resonance circuit together with the primary self-resonance coil 221. The capacitance of the capacitor 222 is appropriately set so as to attain a predetermined resonance frequency on the basis of the inductance of the primary self-resonance coil 221. When a desired resonance frequency is obtained by a stray capacitance of the primary self-resonance coil 221 itself, the capacitor 222 may be omitted.

The primary coil 223 is provided coaxially with the primary self-resonance coil 221, and is able to be magnetically coupled to the primary self-resonance coil 221 through electromagnetic induction. When the matching transformer 260 is provided, the primary coil 223 transmits high-frequency electric power, supplied through the matching transformer, to the primary self-resonance coil 221 through electromagnetic induction.

As described above, the communication unit 230 is a communication interface for carrying out wireless communication between the power transmitting device 200 and the vehicle 100. The communication unit 230 receives the battery information INFO and the signal STRT or signal STP for instructions to start or stop transmission of electric power, transmitted from the communication unit 160 of the vehicle 100, and outputs these pieces of information to the power transmitting ECU 240.

Cash, a prepaid card, a credit card, or the like, is inserted into the fee reception unit 246 in advance of charging. The power transmitting ECU 240 causes the power supply unit 250 to transmit a test signal by using a small electric power. Here, the "small electric power" is an electric power smaller than a charging electric power for charging the battery after authentication or an electric power that is transmitted at the time of position alignment, and may include an electric power that is transmitted intermittently.

The vehicle ECU 300 transmits the control signal SE2 and the control signal SE3 such that the relay 174 is turned on and the CHR 170 is turned off in order to receive the test signal. Then, the vehicle ECU 300 calculates a power receiving efficiency and a charging efficiency on the basis of the voltage VC. The vehicle ECU 300 transmits the calculated charging efficiency or power receiving efficiency to the power transmitting device 200 by the communication unit 160.

The display unit 242 of the power transmitting device 200 shows the charging efficiency or a charging electric power unit price corresponding to the charging efficiency to a user. The display unit 242 may have a function as an input unit, such as a touch panel, and is able to accept user's input for whether to approve the charging electric power unit price.

The power transmitting ECU 240 causes the power supply unit 250 to start full-scale charging when the charging electric power unit price is approved. When charging has been completed, a fee is paid at the fee, reception unit 246.

The power transmitting ECU 240 includes a CPU, a storage device and an input/output buffer (which are not shown in FIG. 7). The power transmitting ECU 240 receives signals from sensors, or the like, and outputs control signals to various devices to thereby control various devices in the charging station 210. These controls are not only limited to processing by software but may also be processed by exclusive hardware (electronic circuit).

Power transfer from the power transmitting device 200 to the vehicle 100 satisfies the relationship between the power transmitting unit 90 and the power receiving unit 91 that are illustrated in FIG. 3 and FIG. 4. In the power transfer system shown in FIG. 7, the difference between the natural frequency of the power transmitting unit 220 and the natural frequency of the power receiving unit 110 is smaller than or equal to ±10% of the natural frequency of one of the power transmitting unit 220 and the power receiving unit 110. By setting the natural frequency of each of the power transmitting unit 220 and the power receiving unit 110 within the above range, it is possible to increase the power transfer efficiency. On the other hand, when the above-described difference in natural frequency is larger than ±10%, the power transfer efficiency becomes lower than 10%, so there occurs an inconvenience, such as an increase in power transfer time.

The vehicle 100 further communicates with the power transmitting device 200, and includes a display unit 142 that shows a determination result as to whether the power transmitting unit 220 is compatible with the power receiving unit 110 of the vehicle 100.

Figure 8:
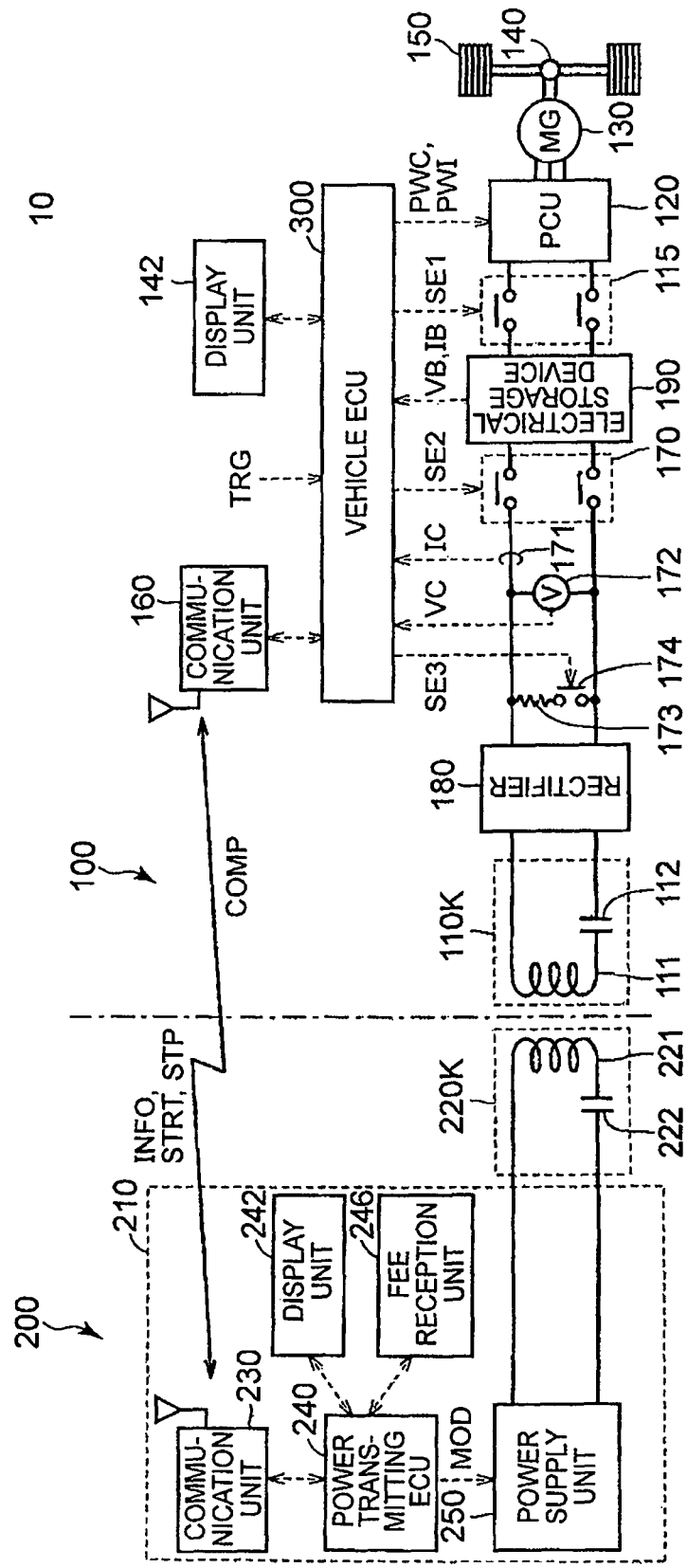
FIG. 8 is a view that shows a power transmitting unit and a power receiving unit according to an alternative embodiment to the embodiment.

FIG. 8 is a view that shows a power transmitting unit and a power receiving unit according to an alternative embodiment. As shown in FIG. 8, the electromagnetic induction coils 113, 223 shown in FIG. 7 may not be interposed. In the configuration shown in FIG. 8, a power transmitting unit 220K is provided at the power transmitting device 200, and a power receiving unit 110K is provided at the vehicle 100.

The power transmitting unit 220K includes the self-resonance coil 221 and the capacitor 222. The self-resonance coil 221 and the capacitor 222 are connected in series with the power supply unit 250.

The power receiving unit 110K includes the self-resonance coil 111 and the capacitor 112. The self-resonance coil 111 and the capacitor 112 are connected in series with the rectifier 180.

The configuration of the other portions shown in FIG. 8 is the same as the configuration illustrated in FIG. 7, so the description is not repeated.

Next, the coil type of each of the power transmitting unit and the power receiving unit will be described. The coil type of each of the power transmitting unit and the power receiving unit is typically a central type (annular type or circular coil type) in which magnetic fluxes pass through the center of a coil and a polarized type (polarized coil type) in which magnetic fluxes pass from one end of a coil to the other end of the coil. The polarized type is further classified into a longitudinally-oriented polarized type and a laterally-oriented polarized type depending on whether a direction in which magnetic fluxes pass is the longitudinal direction or lateral direction of a vehicle. A polarized coil may also be called solenoid coil.

Hereinafter, in the specification, coils, such as a central or circular coil, are collectively termed annular coils, and coils, such as a polarized coil, are collectively termed solenoid coils.

Figure 9:
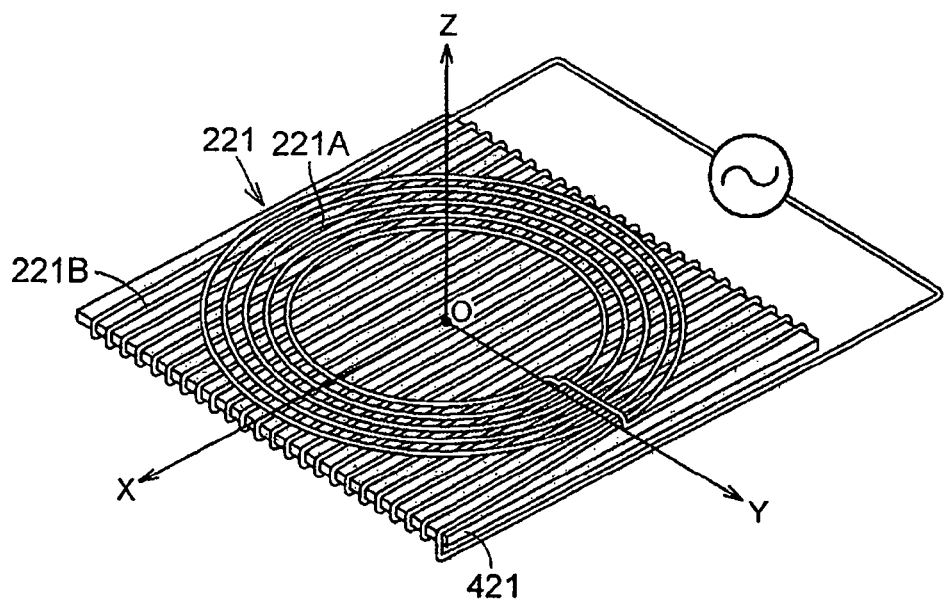
FIG. 9 is a perspective view that shows the structure of coils included in a power transmitting unit of a power transmitting device according to the embodiment.

FIG. 9 is a perspective view that shows the structure of coils included in the power transmitting unit of the power transmitting device according to the present embodiment. As shown in FIG. 9, the coil 221 is a composite coil that combines an annular coil with a solenoid coil. The coil 221 includes an annular coil 221A and a solenoid coil 221B. The annular coil 221A is wound so as to surround a Z axis. The solenoid coil 221B is connected in series with the annular coil 221A and is wound so as to surround a Y axis that intersects with the Z axis. The solenoid coil 221B has such a configuration that a conductive wire is wound around a flat sheet magnetic material 421. The solenoid coil 221B is located with respect to the annular coil 221A such that the Z axis extends through the center portion of the flat sheet magnetic material 421.

When the flat sheet is rectangular, the center portion of the flat sheet magnetic material 421 is around the intersection of diagonal lines, the intersection of a line that connects midpoints of a pair of facing sides of the flat sheet with a line that connects midpoints of another pair of facing sides, or the like. Although another material may be used, a ferrite plate may be desirably used as the flat sheet magnetic material 421.

The flat sheet does not always need to have a rectangular shape. The flat sheet may have a shape such that corners of the rectangular shape may be rounded or cut off obliquely. Furthermore, the flat sheet may have an H shape. Hereinafter, description will be made on an example in which the composite coil shown in FIG. 9 is arranged at the power transmitting unit side; instead, the composite coil may be arranged at the power receiving unit side.

Figure 10:
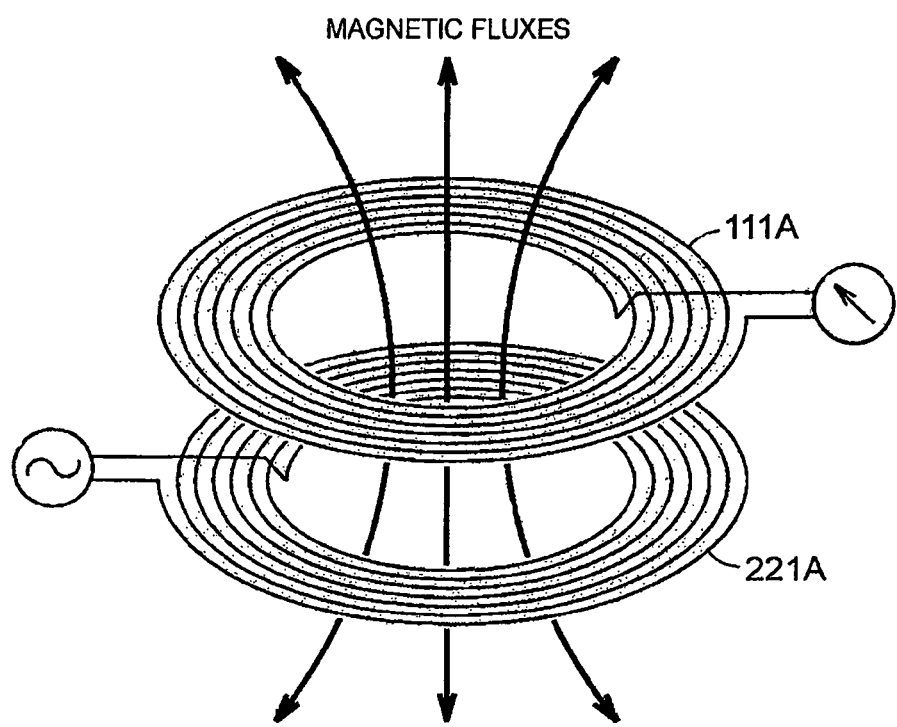
FIG. 10 is a view for illustrating annular coil units.

Next, the direction in which magnetic fluxes pass through each of the annular coil and the solenoid coil will be described. FIG. 10 is a view for illustrating the annular coil units. As shown in FIG. 10, in the example of the annular coil units, the power transmitting unit includes the power transmitting annular coil 221A, and the power receiving unit includes a power receiving coil 111A.

Figure 11:
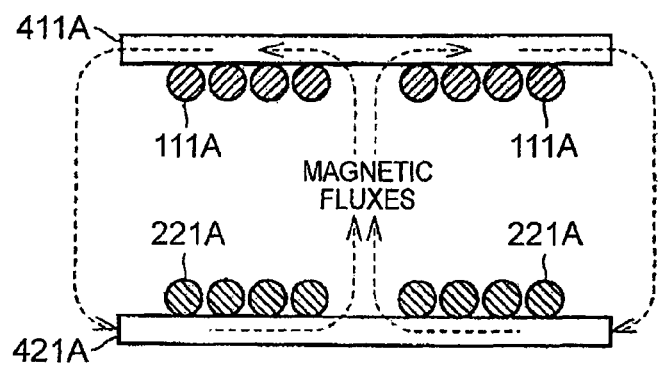
FIG. 11 is a view for illustrating a passage path of magnetic fluxes in the annular coil units.

FIG. 11 is a view for illustrating a passage path of magnetic fluxes in the annular coil units. As shown in FIG. 10 and FIG. 11, in the annular coil units, magnetic fluxes pass through the center portions of the circular coils. For the annular coils, a hollow portion that is located near the center of the outer shape circle of each circular coil and that has no winding wire is termed center portion. Magnetic fluxes that have passed from the center portion of the power transmitting annular coil 221A to the center portion of the power receiving coil 111A pass through the inside of a magnetic material 411A toward the outside, returns around the outside of the coil winding wires, pass through the inside of a magnetic material 421A toward the center portion, and return to the center portion of the power transmitting annular coil 221A. Alternating current flows in the power transmitting unit, so the direction of magnetic fluxes is inverted when the direction of current flowing through the coil is inverted.

Figure 12:
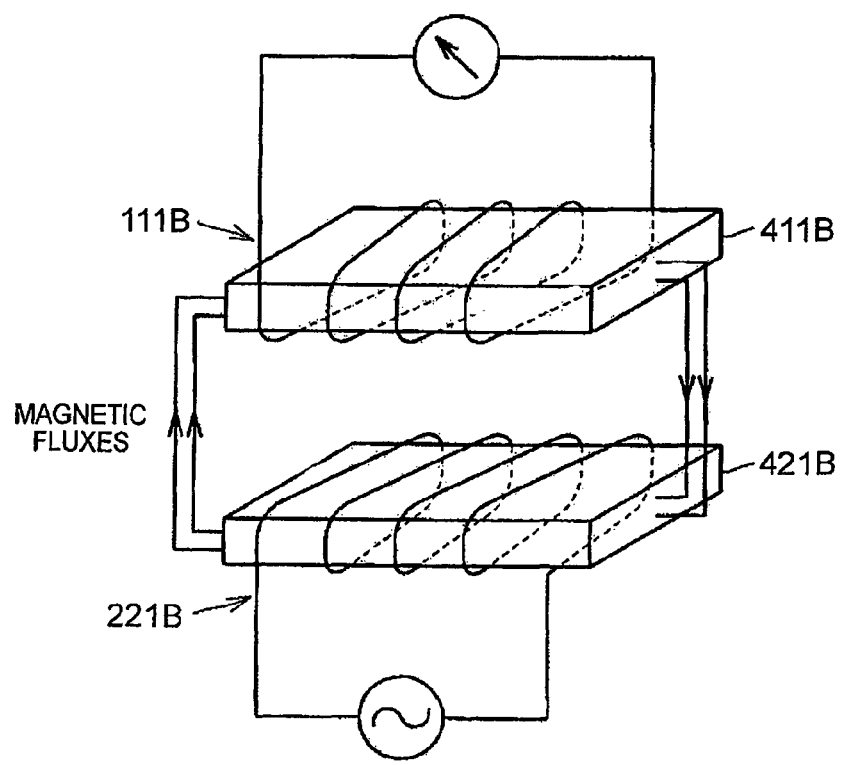
FIG. 12 is a view for illustrating solenoid coil units.

FIG. 12 is a view for illustrating solenoid coil units. As shown in FIG. 12, in the example of the solenoid coil units, the power transmitting unit includes a power transmitting solenoid coil 221B, and the power receiving unit includes a power receiving coil 111B. The power transmitting solenoid coil 221B is wound around a flat sheet magnetic material 421B. The power receiving coil 111B is wound around a flat sheet magnetic material 411B.

Figure 13:
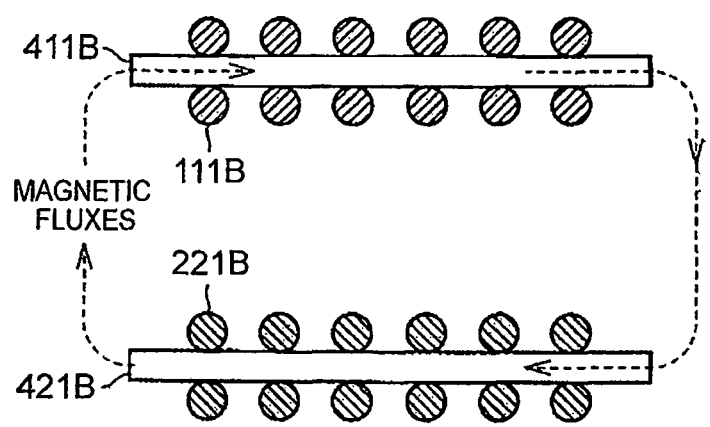
FIG. 13 is a view for illustrating a passage path of magnetic fluxes in the solenoid coil units.

FIG. 13 is a view for illustrating a passage path of magnetic fluxes in the solenoid coil units. As shown in FIG. 12 and FIG. 13, in the solenoid coil units, magnetic fluxes pass through the center portions (insides of the magnetic materials) of the coils wound around the magnetic materials. Magnetic fluxes that have passed through the inside of the magnetic material 421B from one end of the power transmitting solenoid coil 221B toward the other end of the power transmitting solenoid coil 221B travel to one end of the power receiving coil 111B, pass through the inside of the magnetic material 411B from the one end of the power receiving coil 111B toward the other end of the power receiving coil 111B and return to the one end of the power transmitting solenoid coil 221B. Alternating current flows in the power transmitting unit, so the direction of magnetic fluxes is inverted when the direction of current flowing through the coil is inverted.

As shown in FIG. 10 to FIG. 13, each of the power transmitting side and the power receiving side is conceivably a plurality of coil types. There is conceivably a case where the power transmitting side and the power receiving side are respectively supplied with electric power with the use of different coil type units. It is not impossible to transfer electric power between different coil types; however, it is required to adjust the parking position of the vehicle in correspondence with the coil types such that electric power is allowed to be transferred in an optimal condition.

Figure 14:
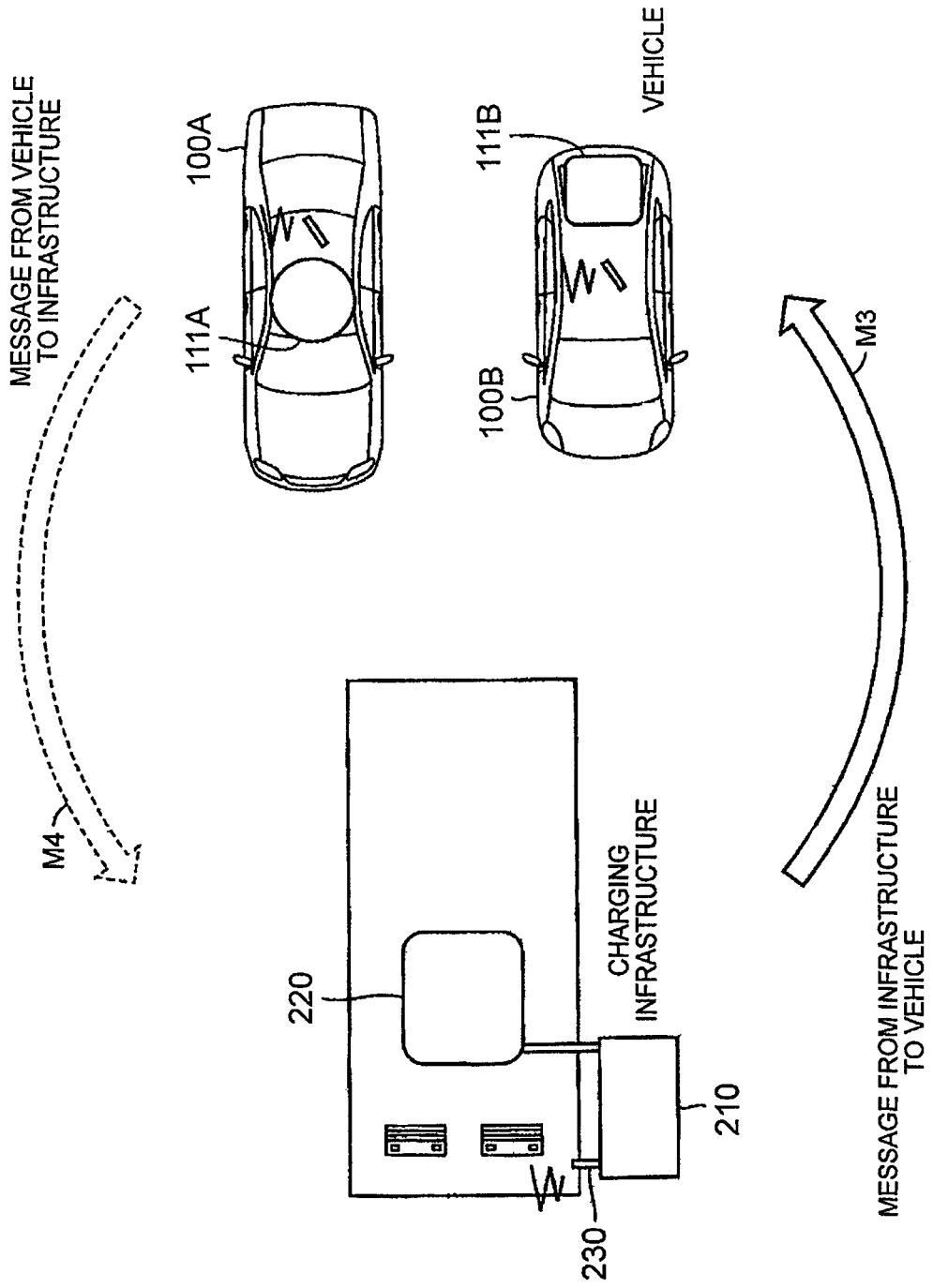
FIG. 14 is a view for illustrating a situation in the case where a vehicle is parked.

FIG. 14 is a view for illustrating a situation in the case where the vehicle is parked. In FIG. 14, a vehicle 100A is a vehicle on which the annular power receiving coil 111A is mounted. A vehicle 100B is a vehicle on which the solenoid power receiving coil 111B is mounted. At this time, it is assumed that the power transmitting unit 220 of any one of the annular type, the solenoid type and the composite type is installed in the power transmitting device 200 that is the charging infrastructure.

Figure 15:
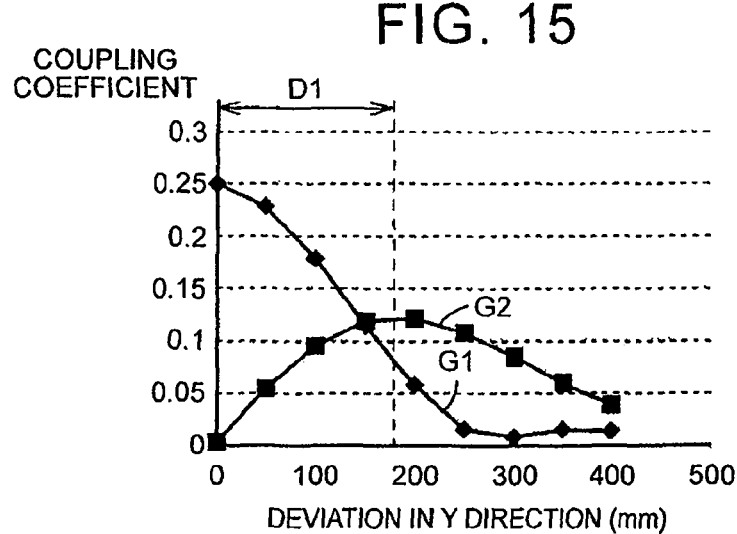
FIG. 15 is a graph that shows the correlation between a deviation of a parking position and a coupling coefficient in the case where the coil type of the power transmitting unit is an annular type.

FIG. 15 is a graph that shows the correlation between a deviation of a parking position and a coupling coefficient in the case where the coil type of the power transmitting unit is an annular type. In FIG. 15, the ordinate axis represents a coupling coefficient, and the abscissa axis represents a deviation in a Y direction. The Y direction is the same as a direction along the Y axis shown in FIG. 9, and the coil is wound around the Y axis in the case of the solenoid coil. A graph G1 in the case where the coil type of the power receiving unit is an annular type and a graph G2 in the case where the coil type of the power receiving unit is a solenoid type are shown.

As shown in the graph G1, when both the coil type of the power receiving unit and the coil type of the power transmitting unit are an annular type, the coupling coefficient is maximum when the deviation in the Y direction is 0. In contrast to this, as shown in the graph G2, when the coil type of the power receiving unit is a solenoid type and the coil type of the power transmitting unit is an annular type, the coupling coefficient is maximum when the deviation in the Y direction is D1. This means that the optimal parking position slightly deviates when the coil type mounted on the vehicle is different.

Figure 16:
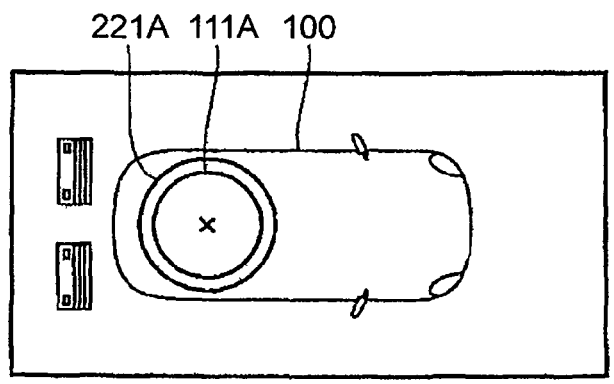
FIG. 16 is a view that shows an optimal parking position in the case where both the coil type of a vehicle side and the coil type of a power transmitting device side are an annular type.
Figure 17:
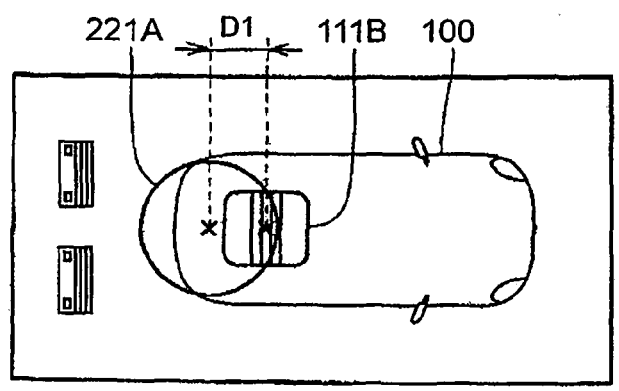
FIG. 17 is a view that shows an optimal parking position in the case where the coil type of the vehicle side is a solenoid type and the coil type of the power transmitting device side is an annular type.

FIG. 16 is a view that shows an optimal parking position in the case where both the coil type of the vehicle side and the coil type of the power transmitting device side are an annular type. FIG. 17 is a view that shows an optimal parking position in the case where the coil type of the vehicle side is a solenoid type and the coil type of the power transmitting device side is an annular type.

As shown in the graph G1 in FIG. 15 and in FIG. 16, when the coil type of the vehicle is an annular type, a position at which the coil centers coincide with each other is an optimal parking position. In contrast to this, as shown in the graph G2 in FIG. 15 and in FIG. 17, when the coil type of the vehicle side is a solenoid type, a position at which the vehicle is caused to travel forward and is parked at the deviation amount D1 from the position at which the center of the power receiving unit coincides with the center of the power transmitting unit is an optimal parking position.

Therefore, it is required to change the parking position depending on the coil type of the power receiving unit mounted on the vehicle, so it is complicated for a driver. Thus, it is desirable that the same parking position be optimal even when the coil type of the power receiving unit is any coil type. In the present embodiment, the composite coil type shown in FIG. 9 is employed for the power transmitting unit.

Figure 18:
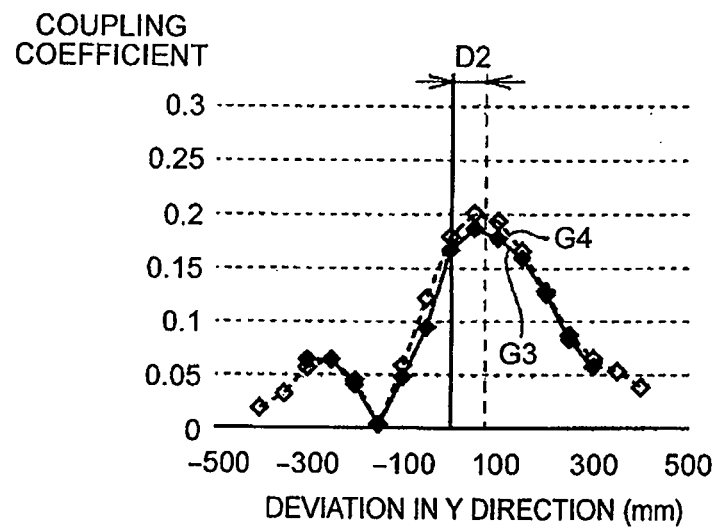
FIG. 18 is a graph that shows the correlation between a deviation of a parking position and a coupling coefficient in the case where the coil type of the power transmitting unit (primary side) is a composite type and the coil type of a power receiving unit (secondary side) is an annular type.

FIG. 18 is a graph that shows the correlation between a deviation of a parking position and a coupling coefficient in the case where the coil type of the power transmitting unit (primary side) is a composite type and the coil type of the power receiving unit (secondary side) is an annular type. In FIG. 18, the ordinate axis represents a coupling coefficient, and the abscissa axis represents a deviation in a Y direction. The Y direction is the same as a direction along the Y axis shown in FIG. 9, and, in the solenoid coil portion of the composite coil, the coil is wound around the Y axis. An actually measured graph G3 in the case where the coil type of the power receiving unit is an annular type and a graph G4 that indicates a simulation value are shown.

It appears from FIG. 18 that the actually measured results mostly coincide with the simulation results. As shown in the graphs G3, G4, the coupling coefficient is maximum when the deviation amount in the Y direction is D2. The deviation amount D2 is smaller than the deviation amount D1 shown in FIG. 15.

Figure 19:
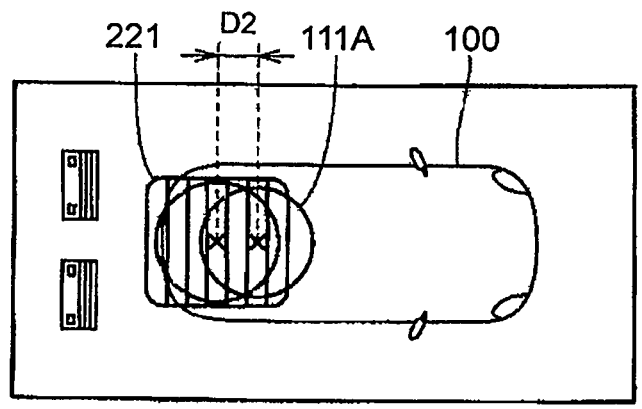
FIG. 19 is a view that shows an optimal parking position in the case of a combination of coil types corresponding to FIG. 18.

FIG. 19 is a view that shows an optimal parking position in the case of a combination of coil types corresponding to FIG. 18. As shown in the graph in FIG. 18 and in FIG. 19, when the coil type of the power transmitting device is a composite type and the coil type of the vehicle side is an annular type, a position at which the vehicle is caused to travel forward and is parked at the deviation amount d1 from a position at which the center of the power receiving unit coincides with the center of the power transmitting unit is an optimal parking position.

Figure 20:
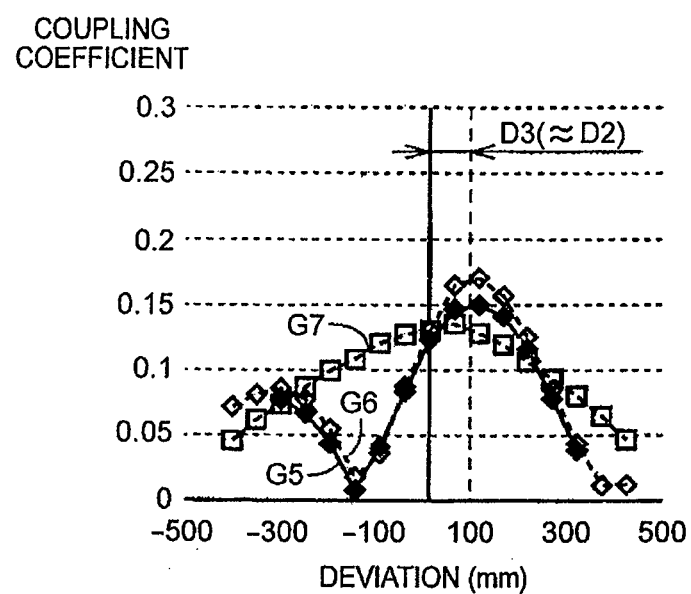
FIG. 20 is a graph that shows the correlation between a deviation of a parking position and a coupling coefficient in the case where the coil type of the power transmitting unit (primary side) is a composite type and the coil type of the power receiving unit (secondary side) is a solenoid type.

FIG. 20 is a graph that shows the correlation between a deviation of a parking position and a coupling coefficient in the case where the coil type of the power transmitting unit (primary side) is a composite type and the coil type of the power receiving unit (secondary side) is a solenoid type. In FIG. 20, the ordinate axis represents a coupling coefficient, and the abscissa axis represents a deviation in a Y direction or an X direction. The Y direction is the same as a direction along the Y axis shown in FIG. 9, and, in the solenoid coil portion of the composite coil, the coil is wound around the Y axis. In addition, in the solenoid coil of the power receiving unit, the coil is wound around an axis parallel to the Y axis. An actually measured graph G5 of a deviation amount in the Y direction in the case where the coil type of the power receiving unit is a solenoid type and a graph G6 that indicates a simulation value are shown; and it appears that the actually measured results mostly coincide with the simulation results. As shown in the graphs G5, G6, the coupling coefficient is maximum when the deviation amount in the Y direction is D3. The deviation amount D3 is smaller than the deviation amount D1 shown in FIG. 15, and is substantially equal to the deviation amount D2 shown in FIG. 18.

FIG. 20 shows a graph G7 that indicates the correlation (simulation value) between a deviation amount in the X direction and a coupling coefficient for reference; however, the coupling coefficient does not vary with a deviation amount in the X direction by a larger amount than with a deviation in the Y direction, so it may be regarded as a parking position suitable for receiving electric power when the deviation amount in the X direction is substantially around zero.

Figure 21:
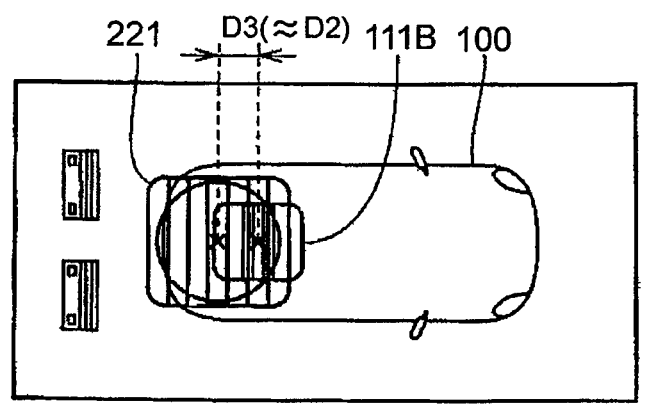
FIG. 21 is a view that shows an optimal parking position in the case of a combination of coil types corresponding to FIG. 20.

FIG. 21 is a view that shows an optimal parking position in the case of a combination of coil types corresponding to FIG. 20. As shown in the graph in FIG. 20 and in FIG. 21, when the coil type of the power transmitting device is a composite type and the coil type of the vehicle side is a solenoid type, a position at which the vehicle is caused to travel forward and is parked at a deviation amount D3 (≈D2) from a position at which the center of the power receiving unit coincides with the center of the power transmitting unit is an optimal parking position.

Through researches of the inventors of the present application, it is found that the peak of power transfer efficiency of the composite coil appears at a position that deviates by a predetermined distance in a winding axis direction of the solenoid portion of the composite coil even when the counterpart coil type is any one of an annular type and a solenoid type as shown in FIG. 18 and FIG. 20. Because the deviation amount D2 is substantially equal to the deviation amount D3, as is apparent from the comparison between FIG. 19 and FIG. 21, it is possible to set the same parking position as an optimal position for receiving electric power even when the type of coil mounted on the vehicle is different. Thus, by employing the composite coil type for the power transmitting device, it is possible to set a uniform parking position, so it is convenient for a driver.

Figure 22:
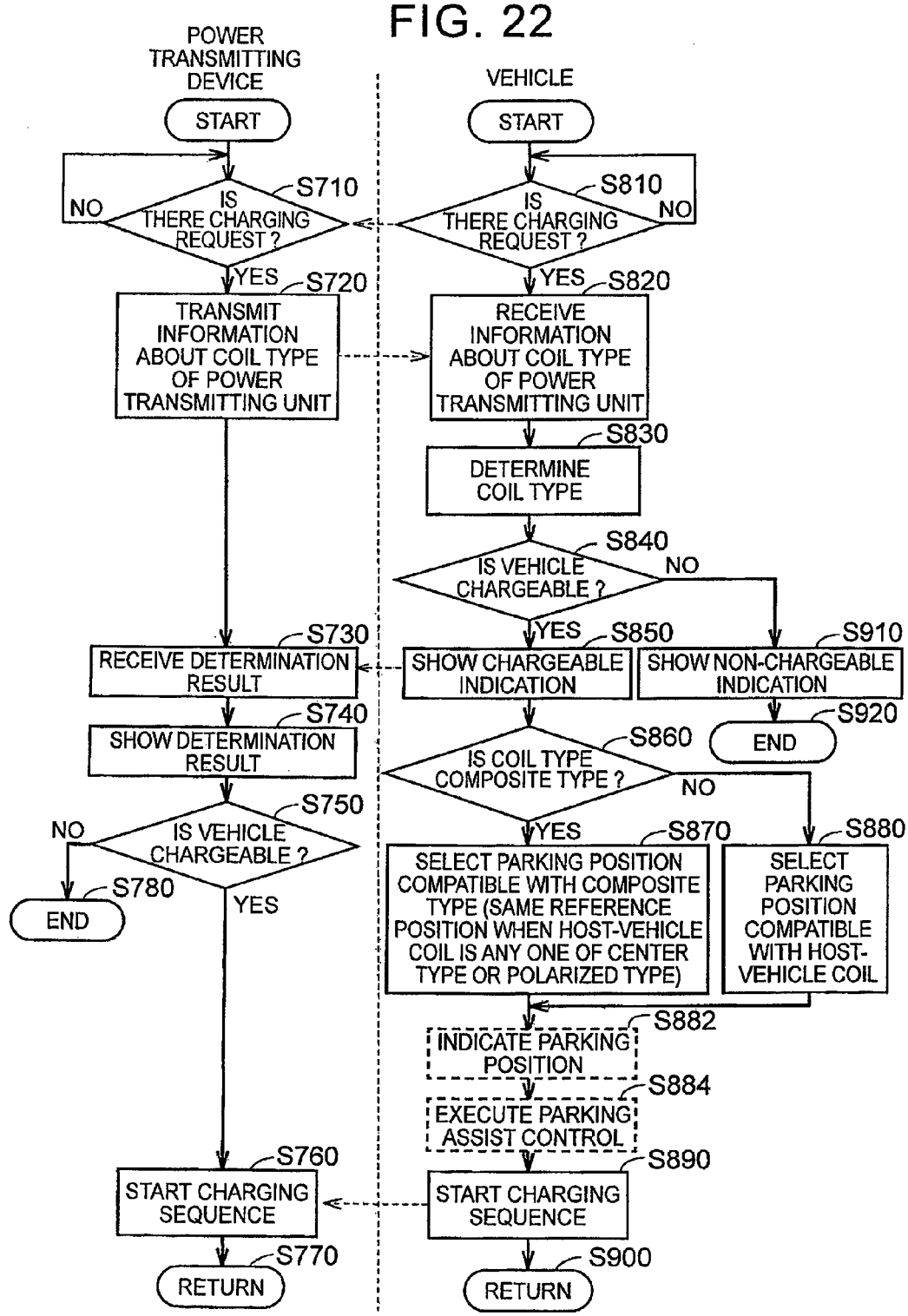
FIG. 22 is a flowchart for illustrating control that is executed in the vehicle and the power transmitting device according to the first embodiment of the invention.

FIG. 22 is a flowchart for illustrating control that is executed in the vehicle and the power transmitting device in a first embodiment.

As shown in FIG. 14 and FIG. 22, in the vehicle 100, in step S810, it is monitored by the vehicle ECU 300 whether there is a charging request. When input of the charging start signal TRG through user's operation, or the like, has been detected, the vehicle ECU 300 transmits the fact that there is a charging request to the power transmitting device 200 via the communication unit 160. Then, the process proceeds from step S810 to step S820.

On the other hand, in the power transmitting device 200, in step S710, it is monitored by the power transmitting ECU 240 whether there is a charging request. When the information about the fact that there is a charging request is transmitted from the communication unit 160 of the vehicle 100, and the power transmitting ECU 240 detects the charging request via the communication unit 230, the process proceeds from step S710 to step S720.

In the power transmitting device 200, in step S720, information about the coil type of the power transmitting unit 220 is transmitted toward the vehicle 100 by the communication unit 230. In the vehicle 100, in step S820, the information about the coil type of the power transmitting unit 220 is received by the communication unit 160, and the coil type of the power transmitting unit 220 is determined in step S830. The information about the coil type, for example, includes information about whether the coil is of an annular type, a solenoid type or a composite type.

Furthermore, in step S840, the vehicle ECU 300 determines whether the coil type of the power transmitting unit is compatible with the coil type from which the power receiving unit is able to receive electric power on the basis of the information about the coil type of the power transmitting unit, received in step S820. When the coil type is compatible, it is determined that the vehicle is chargeable; whereas, when the coil type is not compatible, it is determined that the vehicle is not chargeable.

When the coil type is not compatible in step S840, the process proceeds to step S910, the vehicle ECU 300 fixes the non-chargeable determination, causes the display unit 142 to show non-chargeable determination, and transmits the determination result to the power transmitting device 200. The process at the vehicle side ends in step S920.

On the other hand, when the coil type is compatible in step S840, that is, when the power receiving coil that is compatible with the coil type of the power transmitting device is mounted, the process proceeds to step S850, the vehicle ECU 300 fixes the chargeable determination, causes the display unit 142 to show the determination result, and transmits the determination result to the power transmitting device 200.

For example, when the coil type of the power transmitting device is an annular type and the power receiving coil is a coil type that is able to receive electric power from the annular coil (for example, annular type), it is determined that it is possible to receive electric power.

When the coil type of the power transmitting device is a solenoid type and the power receiving coil is of a coil type that is able to receive electric power from the solenoid coil (for example, solenoid type), it is determined that it is possible to receive electric power.

When the coil type of the power transmitting device is a composite type and the power receiving coil is of a coil type that is able to receive electric power from the composite coil (for example, an annular type or a solenoid type), it is determined that it is possible to receive electric power.

In the power transmitting device 200, in step S730, the determination result is received by the communication unit 230, and, in step S740, the power transmitting ECU 240 causes the display unit 242, such as the liquid crystal display, to show the determination result. The determination result may be provided to a driver by voice instead of indication on the display unit 242.

In the vehicle 100, after the chargeable indication has been made in step S850, it is determined in step S860 whether the coil type of the power transmitting device 200 is a composite type. When it is determined in step S850 that the coil type is a composite type, the process proceeds to step S870, and the vehicle ECU 300 selects a parking position (target position) that is compatible with the composite type. In this case, irrespective of whether the type of coil mounted on the vehicle is an annular type or a solenoid type, it is possible to set the target parking position at substantially the same position. For example, it is possible to set the following parking position as the target parking position. That is, the position of the power transmitting unit is recognized with the use of an in-vehicle camera, or the like, and, as is illustrated in FIG. 19 and FIG. 21, a point obtained by deviating the center of the power transmitting unit by the predetermined distance D3 (=D2) in the winding axis direction of the solenoid (vehicle longitudinal direction) is brought into coincidence with the center of the power receiving unit.

When it is determined in step S860 that the coil type is not a composite type, the process proceeds to step S880, and the vehicle ECU 300 selects a parking position (target position) such that the coil type of the host vehicle is compatible with the coil type of the power transmitting device.

After the target parking position has been selected in step S870 or step S880, the vehicle shows a frame, or the like, indicating the target parking position on the display unit 142 on the basis of the information received in step S882. For example, the parking frame may be automatically recognized from a white line, or the like, on a camera image, and a frame indicating the target parking position may be determined within the recognized parking frame on the basis of the coil type. In this case, a parking frame may not be automatically recognized, and it may be set on a display screen with the use of arrow keys, or the like, while the user seeing a camera image, or the like.

Furthermore, as shown in step S884, parking assist control for parking the vehicle at the target parking position may be executed. Parking assist control may be configured to completely automatically move the vehicle or may be configured such that steering operation is automatically carried out and the user instructs a forward or reverse speed with the use of an accelerator pedal, or the like. In addition, parking assist control may be configured such that a steering operation amount is indicated on a screen, or the like, and the user manually conducts steering operation.

After the parking position is fixed, the process proceeds to step S890. In step S890, the vehicle ECU 300 starts a charging sequence for charging the vehicle, and the process proceeds to a charging process routine in step S900.

In the power transmitting device 200, in step S750, it is determined whether it is chargeable on the basis of the result of determination from the vehicle as to whether it is chargeable. When it is not chargeable in step S750, the process proceeds to step S780, and the charging process at the power transmitting device 200 ends.

When it is chargeable in step S750, the process proceeds to step S760. In synchronization with the start of charging sequence in step S890, communication about the fact that charging is started is carried out from the vehicle to the power transmitting device, and the charging sequence is started in step S760 at the power transmitting device side. Then, the process proceeds to the charging process routine in step S770.

In the first embodiment, the description is made on the vehicle that receives information about the coil structure, and the like, of the power transmitting device through communication (message M3 in FIG. 14), determines the coil type of the power transmitting device and then carries out any one of 1) determining a chargeable parking area, 2) clearly indicating a vehicle stop position to the user and 3) starting the charging sequence. A message M4 from the vehicle to the power transmitting device may be transmitted or not transmitted.

Thus, even with any power transmitting device, it is possible to smoothly start charging, so the convenience of the user improves.

Particularly, when the coil type of the power transmitting device is a composite type, the parking position does not need to be changed so as to be adjusted to the coil type of the vehicle, so a driver is allowed to be hard to mistake the parking position.

The first embodiment will be summarized again with reference to the drawings. The parking assist system for a vehicle, described in the first embodiment, includes detecting means (S820 in FIG. 22) for detecting the coil type of the power transmitting unit 220 of the power supply device installed at a parking lot and target position setting means (S860 to S880 in FIG. 22) for setting the target parking position of the vehicle on the basis of the coil type of the power transmitting unit 220 and the position of the power transmitting unit 220. In the configurations shown in FIG. 7 and FIG. 8, the communication unit 160 serves as the detecting means, and the vehicle ECU 300 serves as the target position setting means. The target position setting means sets the target parking position such that the center of the power receiving unit 110 mounted on the vehicle is located at the predetermined distance (D3 (=D2)) along a second axis from a first axis as shown in FIG. 19 and FIG. 21 when the coil type detected by the detecting means is a composite coil having a configuration such that the annular coil 221A wound to surround the first axis (Z axis) and the solenoid coil 221B wound to surround the second axis (Y axis) that intersects with the first axis (Z axis) are connected in series with each other as shown in FIG. 9. As shown in FIG. 9, the solenoid coil 221B is located with respect to the annular coil 221A such that the first axis (Z axis) extends through the side face center portion of the solenoid coil 221B.

Preferably, the coil type of the power receiving unit 110 mounted on the vehicle is one of the annular coil and the solenoid coil.

Preferably, as shown in FIG. 9, the solenoid coil 221B has a configuration such that a conductive wire is wound around the flat sheet magnetic material 421. The solenoid coil 221B is located with respect to the annular coil 221A such that the first axis (Z axis) extends through the center portion of the flat sheet in the composite coil.

In the first embodiment, the description is made on the example in which the vehicle side receives information about the coil of the power transmitting device and the vehicle-side control device determines the parking position. In a second embodiment, description will be made on an example in which the power transmitting device receives information about the coil of the vehicle side and the power transmitting device-side control device determines the parking position.

Figure 23:
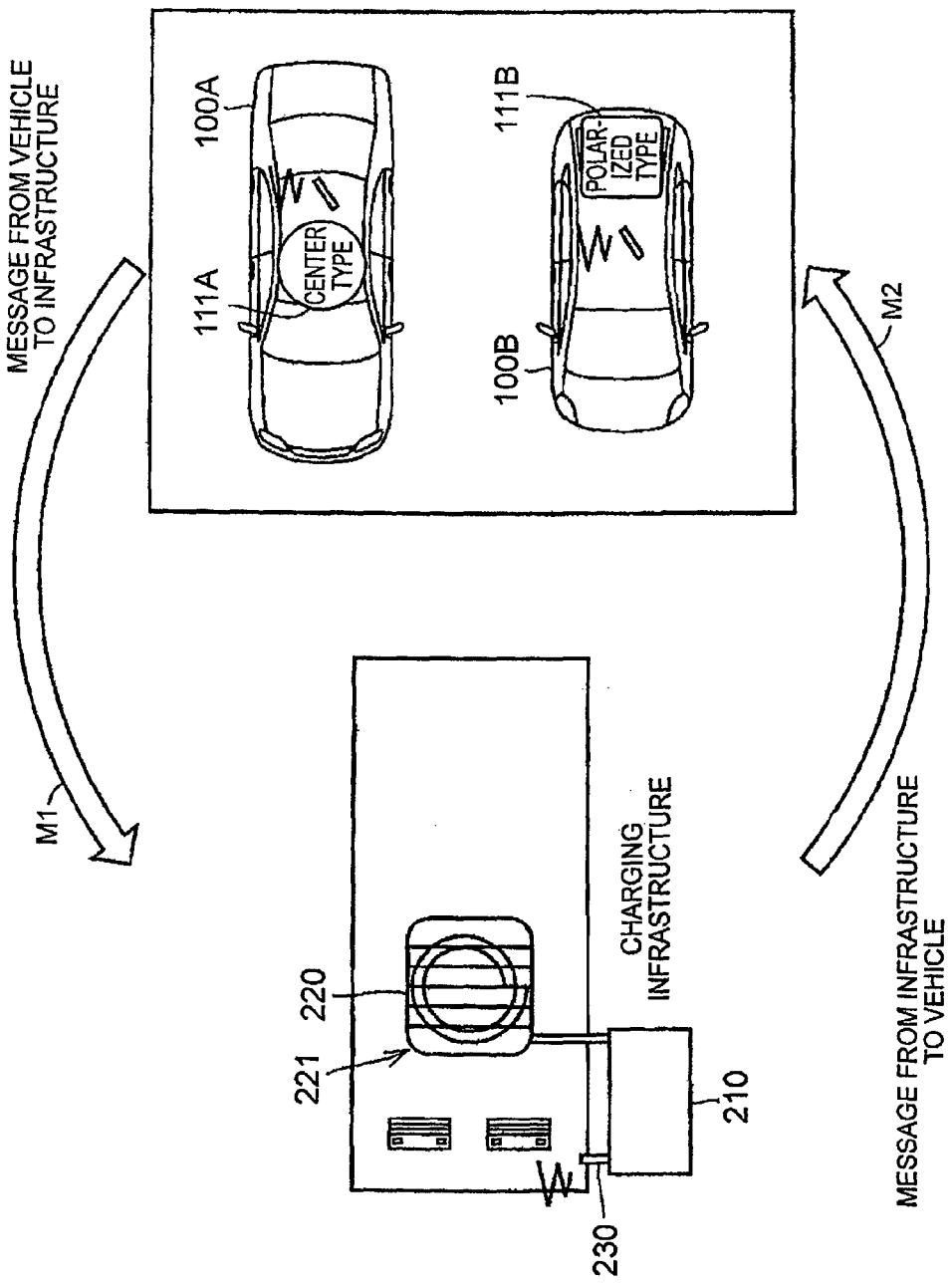
FIG. 23 is a view for illustrating the operation of a contactless power transfer system according to a second embodiment of the invention.

FIG. 23 is a view for illustrating the operation of a contactless power transfer system according to the second embodiment. As shown in FIG. 23, the vehicle 100A is a vehicle in which the annular-type power receiving coil 111A is installed. A vehicle 100B is a vehicle in which the solenoid-type power receiving coil 111B is installed.

Each of the vehicles 100A, 100B transmits a message M1 to the communication unit 230 of the power transmitting device. The message M1 includes information about whether the type of the coil unit installed in the host vehicle is the annular type or the solenoid type. The information that indicates each of coil types, that is, the annular type and the solenoid type, is an example of information that indicates a magnetic flux passage characteristic that expresses how magnetic fluxes pass in the coil unit. Information to be transmitted may be expressed in another format as long as the information indicates the magnetic flux passage characteristic.

It is determined whether each vehicle is chargeable by a charging infrastructure on the basis of the message M1 transmitted from the corresponding vehicle, and a message M2 that indicates the determination result is returned to the corresponding vehicle.

By receiving the message M2 and then showing whether it is chargeable on the display unit, a user is allowed to recognize whether the vehicle is chargeable at the charging facility without parking the vehicle at a parking position. Thus, it is convenient at the time when the user determines whether to utilize the charging facility.

At this time, in the second embodiment, the power transmitting device selects a parking position that is appropriate for the position of the power receiving unit mounted on the vehicle, and provides information about the selected parking position to the vehicle, thus guiding the vehicle.

FIG. 24 is a flowchart for illustrating control that is executed in the vehicle and the power transmitting device in the second embodiment.

As shown in FIG. 23 and FIG. 24, in the vehicle 100, in step S410, it is monitored by the vehicle ECU 300 whether there is a charging request. When input of the charging start signal TRG through user's operation, or the like, has been detected, the vehicle ECU 300 transmits the fact that there is a charging request to the power transmitting device 200 via the communication unit 160. Then, the process proceeds from step S410 to step S420.

On the other hand, in the power transmitting device 200, in step S510, it is monitored by the power transmitting ECU 240 whether there is a charging request. When the information about the fact that there is a charging request is transmitted from the communication unit 160 of the vehicle 100, and the power transmitting ECU 240 detects the charging request via the communication unit 230, the process proceeds from step S510 to step S520.

In the vehicle 100, in step S420, information about the coil type of the power receiving unit 110 is transmitted toward the power transmitting device 200 by the communication unit 160. In the power transmitting device 200, in step S520, the information about the coil type of the power receiving unit 110 is received by the communication unit 230, and the coil type of the power receiving unit 110 is determined in step S530. The information about the coil type, for example, includes information about whether the coil is of the annular type, the solenoid type or the composite type.

Furthermore, in step S540, the power transmitting ECU 240 determines whether the coil type of the power receiving unit 110 is compatible with the coil type that is configurable by the power transmitting unit 220 on the basis of the information about the coil type of the power receiving unit 110, received in step S520. When the coil type is compatible, it is determined that the vehicle is chargeable; whereas, when the coil type is not compatible, it is determined that the vehicle is not chargeable. Here, when the coil type is one of the annular type and the solenoid type, it is determined that the vehicle is chargeable.

When the coil type is not compatible in step S540, the process proceeds to step S610, the power transmitting ECU 240 fixes the non-chargeable determination, causes the display unit 242 to show non-chargeable indication, and transmits the determination result to the vehicle 100. The process at the power transmitting device 200 side ends in step S620.

On the other hand, when the coil type is compatible in step S540, that is, when the coil type of the vehicle is one of the annular type and the solenoid type and the composite coil of the power transmitting device is compatible with the coil type of the vehicle, the process proceeds to step S550, the power transmitting ECU 240 fixes the chargeable determination, causes the display unit 242 to show the determination result, and transmits the determination result to the vehicle 100.

In the vehicle 100, the determination result is received by the communication unit 160 in step S430, and the vehicle ECU 300 causes the display unit 142, such as a liquid crystal display, to show the determination result in step S440. The determination result may be provided to a driver by voice instead of indication on the display unit 142.

In the power transmitting device 200, after the chargeable indication has been made in step S550, the substantially same position is selected as the parking position (target position) in step S570 irrespective of whether the coil type of the vehicle 100 is the annular type or the solenoid type. The target position is a position deviated by the predetermined distance D2 (=D3) along the winding axis of the solenoid coil as shown in FIG. 19 and FIG. 21.

After the parking position has been selected in step S570, the process proceeds to step S580, and the parking position is informed to the user. For example, in order to inform the parking position to the user, a parking frame may be illuminated or information that indicates the parking position may be transmitted to the vehicle.

Subsequently, in step S590, the power transmitting ECU 240 starts a charging sequence for charging the vehicle, and the process proceeds to a charging process routine in step S600.

In the vehicle, in step S450, it is determined whether the vehicle is chargeable on the basis of the result of determination as to whether it is chargeable from the power transmitting device. When it is determined in step S450 that the vehicle is not chargeable, the process proceeds to step S480, and the charging process at the vehicle side ends.

When information that indicates the parking position is transmitted to the vehicle in step S585, the vehicle shows a frame, or the like, indicating the parking position on the display unit 142 on the basis of the information received in step S452. Furthermore, as shown in step S454, parking assist control for parking the vehicle at the target parking position may be executed. Parking assist control may be configured to completely automatically move the vehicle or may be configured such that steering operation is automatically carried out and the user instructs a forward or reverse speed with the use of an accelerator pedal, or the like. In addition, parking assist control may be configured such that a steering operation amount is indicated on a screen, or the like, and the user manually conducts steering operation.

After the parking position is fixed, the process proceeds to step S460. In synchronization with the start of charging sequence in step S590, communication about the fact that the start of charging is instructed is carried out with the vehicle side, and the charging sequence is started in step S460 at the vehicle side. Then, the process proceeds to the charging process routine in step S470.

As described above, when information about the coil type is transmitted from the vehicle to the power transmitting device and the power transmitting device determines the parking position and then provides information about the parking position to the vehicle as well, similar advantageous effects to those of the first embodiment are obtained.

The second embodiment will be summarized again with reference to the drawings. The parking assist system for a vehicle, described in the second embodiment, includes detecting means (S520 in FIG. 24) for detecting the coil type of the power receiving unit 110 installed in the vehicle and target position setting means (S530, S570 in FIG. 24) for stetting the target parking position of the vehicle on the basis of the coil type of the power receiving unit 110 and the position of the power receiving unit 110. In the configurations of FIG. 7 and FIG. 8, the communication unit 230 serves as the detecting means, and the power transmitting ECU 240 serves as the target position setting means. The power transmitting device includes the composite coil. The composite coil has a configuration such that the annular coil 221A wound to surround the first axis (Z axis) and the solenoid coil 221B wound to surround the second axis (Y axis) that intersects with the first axis (Z axis) are connected in series with each other as shown in FIG. 9.

The target position setting means sets the target parking position such that the center of the power receiving unit 110 mounted on the vehicle is located at the predetermined distance (D3 (=D2)) along the second axis from the first axis as shown in FIG. 19 and FIG. 21 when the coil type detected by the detecting means is one of the annular type and the solenoid type. As shown in FIG. 9, the solenoid coil 221B is located with respect to the annular coil 221A such that the first axis (Z axis) extends through the side face center portion of the solenoid coil 221B.

Preferably, as shown in FIG. 9, the solenoid coil 221B has a configuration such that a conductive wire is wound around the flat sheet magnetic material 421. The solenoid coil 221B is located with respect to the annular coil 221A such that the first axis (Z axis) extends through the center portion of the flat sheet in the composite coil.

In the first and second embodiments, the description is made on the example in which the composite coil is arranged at the power transmitting device side; instead, the composite coil may be arranged at the power receiving device of the vehicle. This case will be described as a third embodiment.

When the composite coil is mounted on the vehicle 100 in FIG. 15, even when the coil of the power transmitting device is of an annular coil type or a solenoid coil type, it is possible to set the same parking position. In such a case, irrespective of the type of the coil in the power transmitting device, it is possible to determine the same position as the target parking position, and it is also further possible to execute parking assist control over the target parking position.

The parking assist system for a vehicle, described in the third embodiment, includes the power receiving unit 110 that contactlessly receives electric power and assists the vehicle in parking as shown in FIG. 7 and FIG. 8. The power receiving unit 110 includes the composite coil having a configuration such that the annular coil 221A wound to surround the first axis (Z axis) and the solenoid coil 221B wound to surround the second axis (Y axis) that intersects with the first axis (Z axis) are connected in series with each other as shown in FIG. 9. When the composite coil is installed in the power receiving unit 110, a load is connected instead of an alternating-current power supply in FIG. 9. The parking assist system includes target position setting means for setting the target parking position of the vehicle on the basis of the position of the power transmitting unit 220 of the power supply device installed at a parking lot. In the configurations shown in FIG. 7 and FIG. 8, the power transmitting ECU 240 or the vehicle ECU 300 serves as the target position setting means. The target position setting means sets the target parking position such that the center of the power transmitting unit 220 is located at the predetermined distance (which corresponds to D3 (=D2) in FIG. 18 to FIG. 21) along the second axis from the first axis. As shown in FIG. 9, the solenoid coil 221B is located with respect to the annular coil 221A such that the first axis (Z axis) extends through the side face center portion of the solenoid coil 221B.

Preferably, the coil type of the power transmitting unit 220 is one of the annular coil and the solenoid coil.

Preferably, as shown in FIG. 9, the solenoid coil 221B has a configuration such that a conductive wire is wound around the flat sheet magnetic material 421. The solenoid coil 221B is located with respect to the annular coil 221A such that the first axis (Z axis) extends through the center portion of the flat sheet in the composite coil.

The present embodiments describe the example in which the power receiving device is the vehicle. Instead, even when the power receiving device is a portable device, the invention is applicable.

What is claimed is:

1. A parking assist system for a vehicle configured to contactlessly receive electric power,
the parking assist system comprising:
a detector configured to detect a coil type of a power transmitting portion of a power supply device installed at a parking lot; and
an electronic control unit configured to set a target parking position of the vehicle based on the coil type of the power transmitting portion and a position of the power transmitting portion,
the electronic control unit being configured to set the target parking position such that a center of a power receiving portion mounted on the vehicle is located at a predetermined distance from a first axis along a second axis that intersects with the first axis, when the coil type detected by the detector is a composite coil having a configuration such that an annular coil and a solenoid coil are connected in series with each other, the annular coil being wound to surround the first axis, the solenoid coil being located with respect to the annular coil such that the first axis extends through a side face center portion of the solenoid coil, and the solenoid coil being wound to surround the second axis.

2. The parking assist system for the vehicle according to claim 1, wherein a coil type of the power receiving portion mounted on the vehicle is one of an annular coil and a solenoid coil.

3. The parking assist system for the vehicle according to claim 1, wherein the predetermined distance is shorter than or equal to a distance from the side face center portion of the solenoid coil to a side face end portion of the solenoid coil.

4. The parking assist system for the vehicle according to claim 1, wherein:
the solenoid coil has a configuration such that a conductive wire is wound around a flat sheet magnetic material, and
the solenoid coil is located with respect to the annular coil such that the first axis extends through a center portion of the flat sheet in the composite coil.

5. The parking assist system for the vehicle according to claim 1, wherein a difference between a natural frequency of the power transmitting portion and a natural frequency of the power receiving portion falls within a range of ±10%.

6. The parking assist system for the vehicle according to claim 1, wherein the power receiving portion is configured to receive electric power from the power transmitting portion through at least one of a magnetic field and an electric field, the magnetic field being formed between the power receiving portion and the power transmitting portion, the magnetic field oscillating at a predetermined frequency, the electric field being formed between the power receiving portion and the power transmitting portion, and the electric field oscillating at a predetermined frequency.

7. A parking assist system for a vehicle,
the parking assist system comprising:
a power receiving portion included in the vehicle and configured to contactlessly receive electric power, the power receiving portion including a composite coil having a configuration such that an annular coil and a solenoid coil are connected in series with each other, the annular coil being wound to surround a first axis, the solenoid coil being located with respect to the annular coil such that the first axis extends through a side face center portion, and the solenoid coil being wound to surround a second axis that intersects with the first axis; and
the parking assist system comprises a electronic control unit configured to set a target parking position of the vehicle based on a position of a power transmitting portion of a power supply device installed at a parking lot; and
the electronic control unit being configured to set the target parking position such that a center of the power transmitting portion is located at a predetermined distance from the first axis along the second axis.

8. The parking assist system for the vehicle according to claim 7, wherein a coil type of the power transmitting portion is one of an annular coil and a solenoid coil.

9. The parking assist system for the vehicle according to claim 7, wherein the predetermined distance is shorter than or equal to a distance from the side face center portion of the solenoid coil to a side face end portion of the solenoid coil.

10. The parking assist system for the vehicle according to claim 7, wherein:
the solenoid coil has a configuration such that a conductive wire is wound around a flat sheet magnetic material, and
the solenoid coil is located with respect to the annular coil such that the first axis extends through a center portion of the flat sheet in the composite coil.

11. The parking assist system for the vehicle according to claim 7, wherein a difference between a natural frequency of a power transmitting portion and a natural frequency of the power receiving portion falls within a range of ±10%.

12. The parking assist system for the vehicle according to claim 7, wherein the power receiving portion receives electric power from the power transmitting portion through at least one of a magnetic field and an electric field, the magnetic field being formed between the power receiving portion and the power transmitting portion, the magnetic field oscillating at a predetermined frequency, the electric field being formed between the power receiving portion and the power transmitting portion, and the electric field oscillating at a predetermined frequency.

* * * * *